(12) United States Patent
Fujihara

(10) Patent No.: US 7,428,569 B1
(45) Date of Patent: Sep. 23, 2008

(54) INFORMATION PROCESSING APPARATUS, INFORMATION PROCESSING METHOD, AND PROVISION MEDIUM

(75) Inventor: Masahiro Fujihara, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/569,251

(22) Filed: May 11, 2000

(30) Foreign Application Priority Data

| May 14, 1999 | (JP) | ............................. P11-135010 |
| May 28, 1999 | (JP) | ............................. P11-150597 |

(51) Int. Cl.
   *G06F 15/16* (2006.01)
(52) U.S. Cl. .................. 709/201; 709/217; 707/10; 382/321
(58) Field of Classification Search .............. 709/206, 709/207, 224, 225, 217–219; 382/113, 313, 382/176
   See application file for complete search history.

(56) References Cited

U.S. PATENT DOCUMENTS

| 4,941,125 | A | * | 7/1990 | Boyne ......................... 707/102 |
| 5,262,860 | A | * | 11/1993 | Fitzpatrick et al. .......... 348/461 |
| 5,844,505 | A | * | 12/1998 | Van Ryzin .................. 340/988 |
| 5,892,845 | A | * | 4/1999 | Yamanaka et al. .......... 382/187 |
| 6,049,773 | A | * | 4/2000 | McCormack et al. .......... 705/4 |
| 6,064,779 | A | * | 5/2000 | Neukermans et al. ....... 382/313 |
| 6,154,727 | A | * | 11/2000 | Karp et al. ..................... 705/3 |
| 6,304,313 | B1 | * | 10/2001 | Honma ........................ 355/18 |
| 6,311,214 | B1 | * | 10/2001 | Rhoads ...................... 709/217 |
| 6,356,356 | B1 | * | 3/2002 | Miller et al. ............... 358/1.15 |
| 6,370,547 | B1 | * | 4/2002 | Eftink ........................ 707/201 |
| 6,385,465 | B1 | * | 5/2002 | Yoshioka .................... 455/564 |
| 6,473,523 | B1 | * | 10/2002 | Newman et al. ............ 382/176 |
| 6,778,683 | B1 | * | 8/2004 | Bonner et al. .............. 382/101 |
| 6,980,631 | B1 | * | 12/2005 | Danzl et al. ............ 379/112.01 |
| 2002/0005804 | A1 | * | 1/2002 | Suprunov ................... 342/457 |
| 2003/0040957 | A1 | * | 2/2003 | Rodriguez et al. ........... 705/14 |
| 2003/0069797 | A1 | * | 4/2003 | Harrison ..................... 705/26 |

* cited by examiner

*Primary Examiner*—Bunjob Jaroenchonwanit
*Assistant Examiner*—Duyen M Doan
(74) *Attorney, Agent, or Firm*—Oblon, Spivak, McClelland, Maier & Neustadt, P.C.

(57) ABSTRACT

An information processing apparatus, an information processing method and a computer readable medium that analyze a character string and execute desired processing using a simple operation. A character string reading device reads the character string in an image photographed by a photographing device, a character string capture and analysis device identifies a type of information represented by the character string by capturing and analyzing the character string read by such character string reading device, and extracting information represented by the character string, and a display controlling device generates an analysis result screen including the type of the character string and the information obtained by such character string capture and analysis device and displaying the analysis result screen on a display.

7 Claims, 17 Drawing Sheets

INFORMATION PROCESSING APPARATUS, INFORMATION PROCESSING METHOD, AND PROVISION MEDIUM

FIELD OF THE INVENTION

The present invention relates to an information processing apparatus, an information processing method and a provision medium, and more particularly, is suitably applied to, for example, a personal computer.

DESCRIPTION OF THE RELATED ART

Conventionally, a personal computer (hereinafter referred to as computer equipment) controls an entire system based on the operating system (OS), for example, Windows 98w, stored in a hard disk therein, and initiates application software (hereinafter referred to as application) via the OS, thereby executing desired processing.

In the OS of such a computer system, a variety of user interfaces have been developed in order to improve usability for users and, by relating an application necessary for referring to a file storing for example prescribed information and a program to the extender (such as.COM and.DOC) of the file, the linkage between data having files as unit and applications and the embedding of data in the application are achieved.

Furthermore, recently, an application partly including a program called a character string extraction system (Japanese Patent Application No. 09-305351) has been proposed, and in the case where the application is used, when a desired character string (for example, an English word) of text data in a file is designated by a cursor on the screen, a part thereof lying between front and back spaces and terminal letters such as periods are extracted as a designated English word, and the meaning of the English word is retrieved by a lexicon application and displayed near the cursor.

Then, in the computer equipment of the configuration, although it was possible to perform linking between data having files as unit and applications, it was impossible to identify the type of information (for example, addresses, telephone numbers or e-mail addresses) represented by a specified character string from text data configuring the file, thus making it difficult to link information of a character string to an application related thereto for each type of information.

As shown in FIG. 1, for example, only a usual pop-up menu PM1 is displayed by clicking right button of the mouse when the cursor is placed over the character string, "Phone: 03-5448-O∆∆X" on the application image, and complicated operation had to be performed in order to link the application related to the telephone number which is the type of character string, to the information of the character string.

That is, in a computer equipment, the part of the character string over which the cursor is placed is recognized as a mere character string rather than a telephone number, and when using the telephone number which is the information of this character string, the application utilizing telephone numbers had to be initiated to perform a cut-and-paste operation of pasting the corresponding place with data of telephone numbers once the data of telephone numbers were saved in a clipboard using the copy function of the OS, thus rising a disadvantage that operation is complicated and bothersome.

Furthermore, in a computer equipment equipped with an application partly including a character string extraction system, although it was possible to extract English words as a character string from text data configuring a file and link lexicon applications related in advance to the extracted character string to retrieve the meanings of English words, it was impossible to identify the type of information represented by the character string. It was therefore difficult to link the information of the character string with applications related to each thereof (for example, an application for displaying the place on the map corresponding to the address, an application for telephoning, and an application for sending e-mail).

SUMMARY OF THE INVENTION

In view of the foregoing, an object of the present invention is to provide an information processing apparatus, an information processing method and a provision medium capable of analyzing the character string and executing desired processing only by simple operation by the user.

The foregoing object and other objects of the invention have been achieved by the provision of an information processing apparatus that makes it possible to read and analyze a character string and then display the result of analysis thereof in an analysis result screen by providing character string reading means for reading the character string in the image photographed by photographing means, character string capture and analysis means for identifying the type of information represented by the character string by capturing and analyzing the character string read by the character string reading means, and extracting the information represented by the character string, and display controlling means for generating the analysis result screen including the type and the information of the character string obtained by the character string capture and analysis means, and displaying the analysis result screen on prescribed display means, and consequently, simply by making photographing means photograph a desired subject to be photographed, the user can recognize the type of information represented by the character string described in the subject to be photographed and the information represented by the character string.

Furthermore, according to the present invention, there is provided an information processing method that makes it possible to read and analyze a character string and then display the result of analysis thereof in an analysis result screen by providing the steps of reading the character string in the image photographed by photographing means, character string capturing and analyzing for identifying the type of information represented by the character string by capturing and analyzing the character string read by the step of reading the character string and extracting the information represented by the character string, and display controlling for generating the analysis result screen including the type and the information of the character string obtained by the step of character string capturing and analyzing, and displaying the analysis result screen on prescribed display means, and consequently, simply by making photographing means photograph a desired subject to be photographed, the user can recognize the type of information represented by the character string described in the subject to be photographed and the information represented by the character string.

Still Further, according to the present invention, there is provided a provision medium that makes it possible to read and analyze a character string and then display the result of analysis thereof in an analysis result screen by providing the steps of reading the character string in the image photographed by photographing means, character string capturing and analyzing for identifying the type of information represented by the character string by capturing and analyzing the character string read by the step of reading the character string and extracting the information represented by the character string, and display controlling for generating the analysis result screen including the type and the information of the character string obtained by the step of character string capturing and analyzing, and displaying the analysis result screen on prescribed display means, and consequently, by simply making photographing means photograph a desired subject to be photographed, the user can recognize the type of information represented by the character string described in the subject to be photographed and the information represented by the character string.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of the present invention will be described with reference to the accompanying drawings:

(1) Appearance Configuration of Computer Equipment

Figure 1:
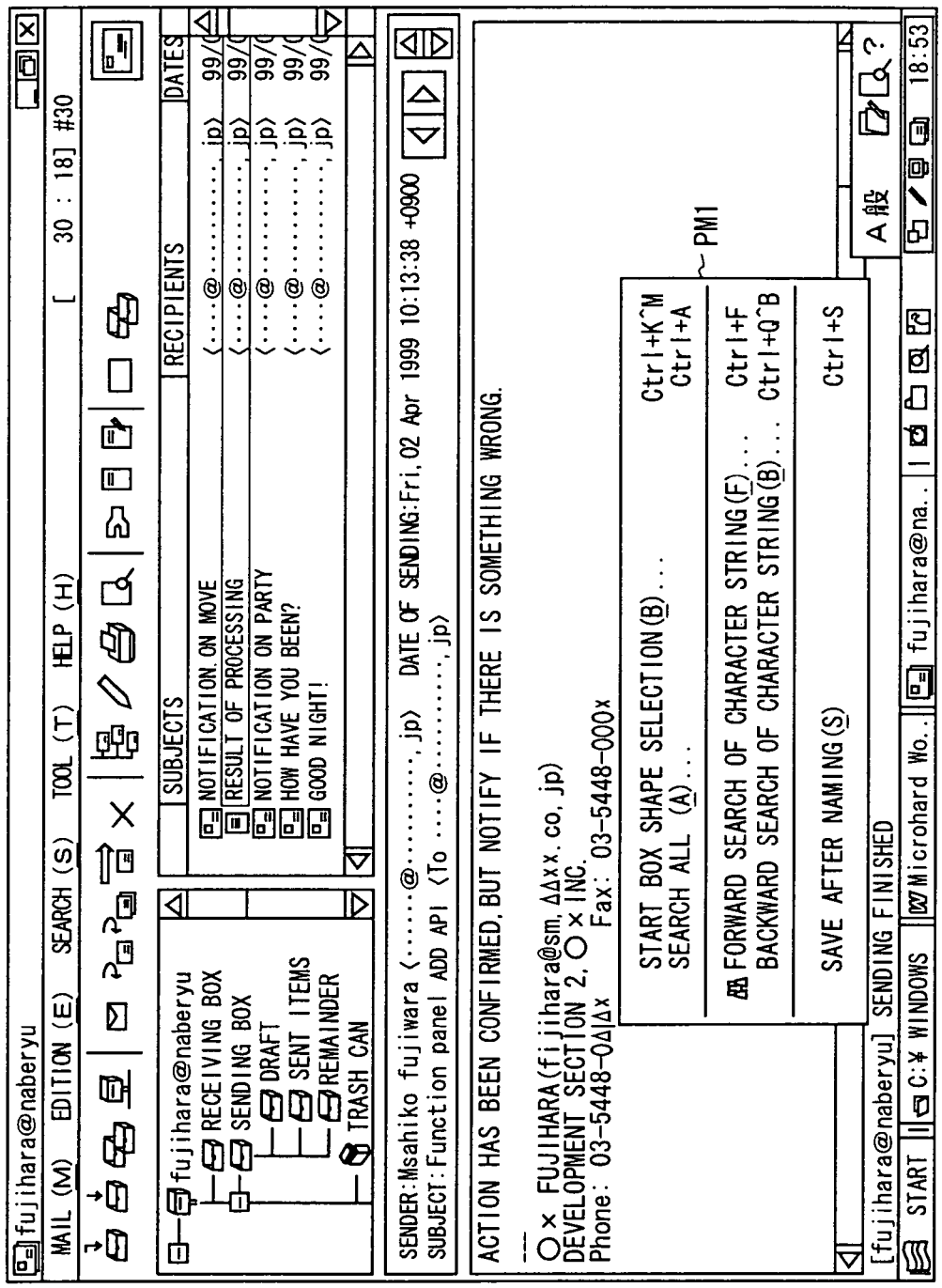
FIG. 1 is schematic diagram of a conventional normal pop up menu.
Figure 2:
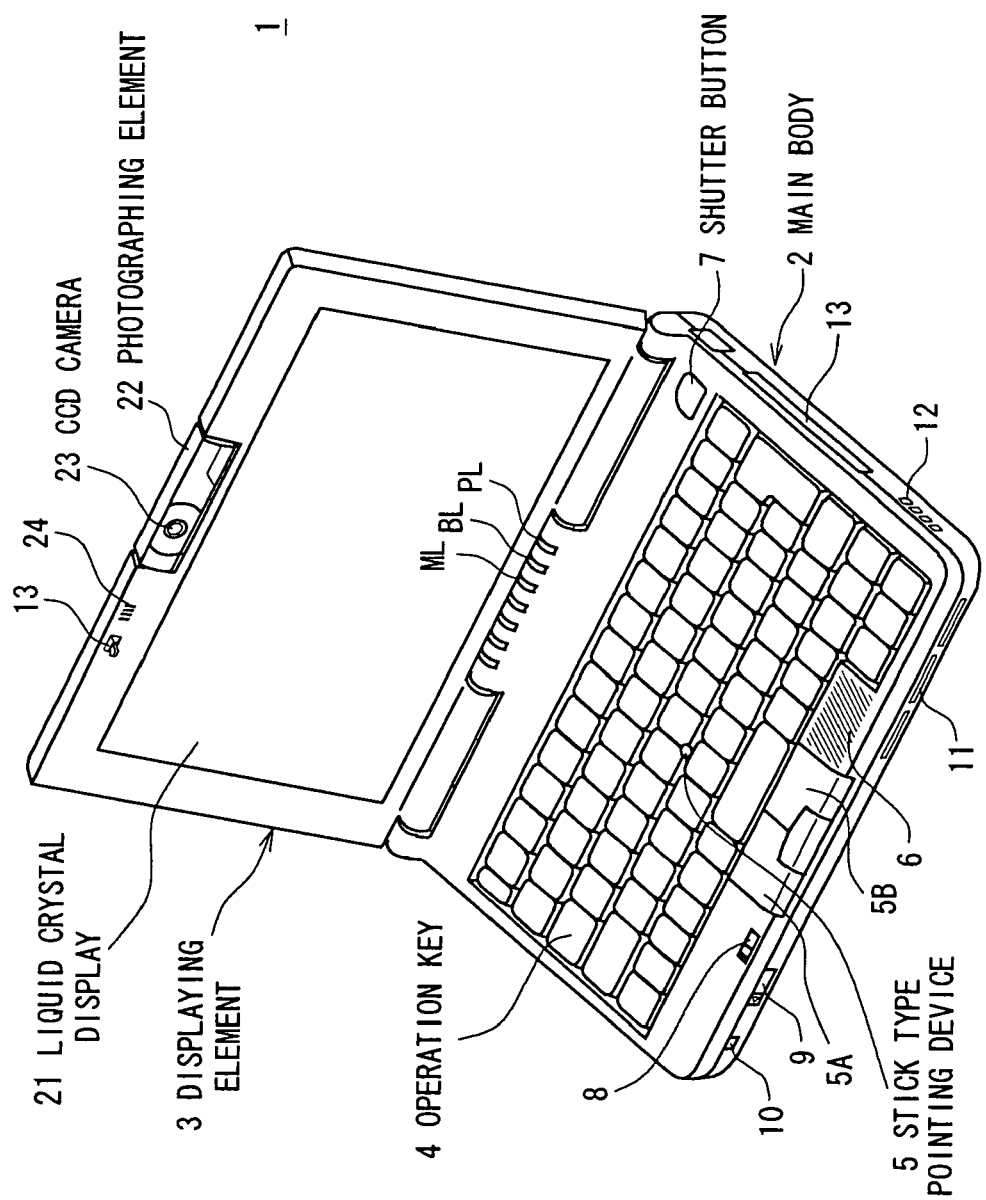
FIG. 2 is a schematic perspective diagram of an overall configuration of computer equipment.

In FIG. 2, 1 shows a portable personal computer equipment (hereinafter referred to as computer equipment) configuring an information processing apparatus of the present invention, and it in this case is a laptop easy-to-carry personal computer of B5-size or less.

This computer equipment 1 is configured by a main body 2 and a displaying element 3 installed free to be opened and closed to the main body 2. On the main body 2 are provided a plurality of operation keys 4 for entering various kinds of letters or symbols and numbers etc., a stick-type pointing device 5 for operating when moving a cursor displayed on the displaying element 3, a built-in speaker 6, and a shutter button 7 for operating when photographing an image by a charge coupled device (CCD) camera 23 provided on the displaying element 3.

On the front face of the displaying element 3 is provided a liquid crystal display 21 composed of liquid crystal display (LCD), and on the upper end in the center of the front face, a photographing element 22 comprising the CCD camera 23 is rotatably installed to the displaying element 3.

Figure 3:
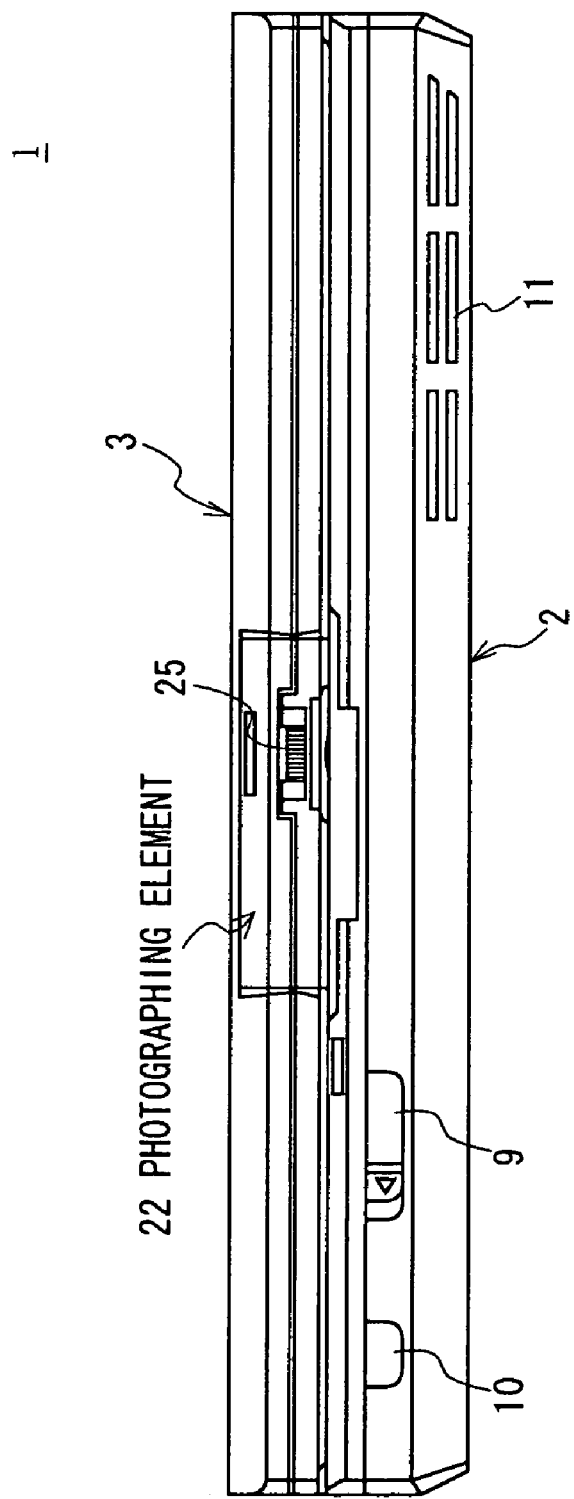
FIG. 3 is a schematic diagram of a front configuration of the main body.

That is, the photographing element 22 can rotate within the angle of 180 degrees or less between the front direction and the back direction of the displaying element 3 to find a location in any position. Also on the photographing element 22 is provided an adjustment ring 25 to perform focus adjustment for the CCD camera 23 as shown in FIG. 3, thereby easily executing focus adjustment by rotation of the adjustment ring 25 when the subject to be photographed is photographed by the CCD camera 23.

Furthermore, on the front face of the displaying element 3 (FIG. 2) is provided a microphone 24 next to the photographing element 22 on the left side, thereby making it possible to collect sounds also from the back side of the displaying element 3 (FIG. 6) via the microphone 24.

Furthermore, at the lower end in the center of the front face in the displaying element 3 are provided an electric power lamp PL, an electric power lamp BL, a message lamp ML and lamps adaptable to a variety of other uses, which comprise light emitting diode (LED).

Furthermore, at the upper end of the front face of the displaying element 3 is provided a claw 13 left to the microphone 24, and is also provided a pore portion 8 in a designated position on the main body 2 corresponding to the claw 13, and the claw 13 is fitted and locked in the pore portion 8 under the condition that the displaying element 3 is closed against the main body 2.

On the front face of the main body 2, a slide lever 9 is provided as shown in FIG. 3, making it possible to release the claw 13 fitted in the pore portion 8 and open the displaying element 3 from the main body 2 by sliding the slide lever 9 in the arrow direction along the front face.

Furthermore, on the face of the main body 2 is provided a programmable power key (PPK key) 10 on the left end for starting up a prescribed application software (hereinafter referred to simply as application) at the push of a button after the power is turned on and running automatically a series of operations set in advance, and is also provided a plurality of air inlet pores 11 at the right end.

Figure 4:
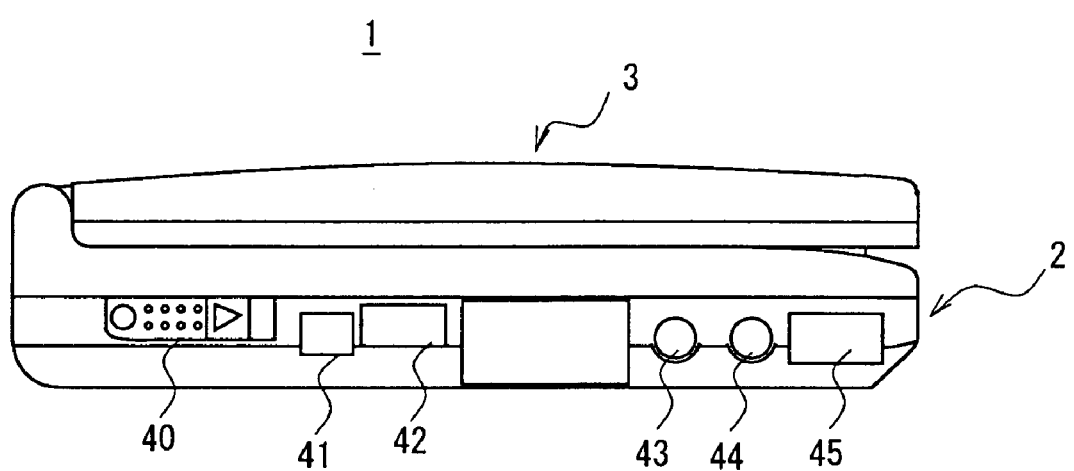
FIG. 4 is a schematic diagram of a displaying element closed relative to the main body.

On the left side of the main body 2 are provided a slide power switch 40, a 4 pin-equivalent institute of electrical and electronics engineers (IEEE) 1394 terminal 41, a universal serial bus (USB) terminal 42, an input terminal 43 for microphone, a headphone terminal 44 and an infrared port 45 conforming to infrared data association (IrDA), as shown in FIG. 4.

Figure 5:
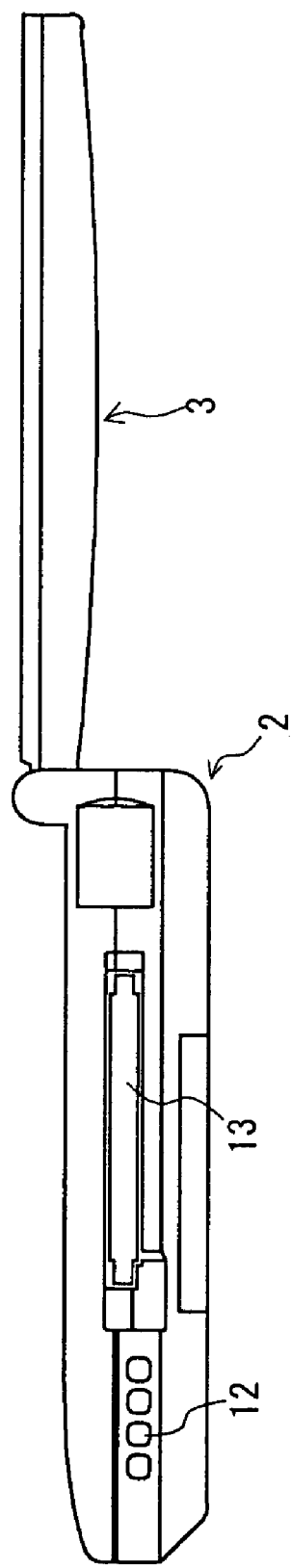
FIG. 5 is a schematic diagram of a displaying element open at 180 degrees relative to the main body.

As shown in FIG. 5, air outlet pores 12 are provided on the right side of the main body 2, and a PC card slot 13 for inserting a personal computer memory card international association (PCMCIA) card (hereinafter referred to as PC card) is provided next to the air outlet pores 12 in the right side.

Figure 6:
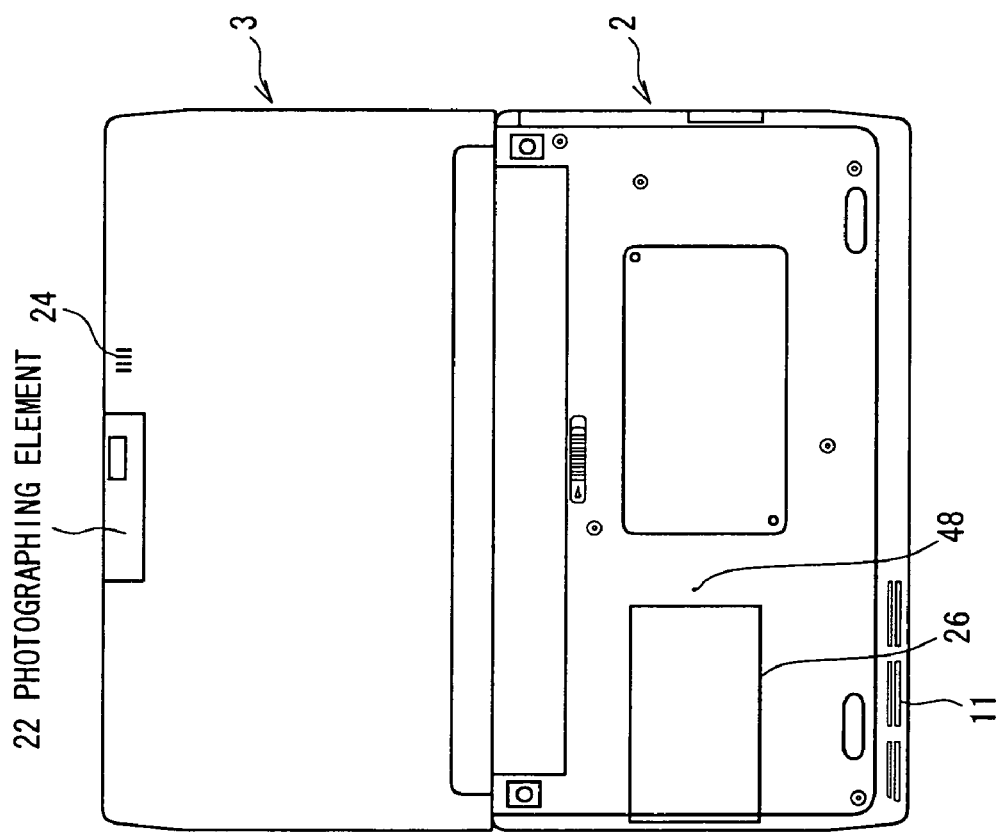
FIG. 6 is a schematic diagram of an underside configuration of the main body.

Furthermore, on the underside of the main body 2, a cap 26 to cover an opening portion 25 for installing an extension memory is mounted, and a pore 48 for inserting pins to remove the claw for locking the cap 26 is provided, as shown in FIG. 6.

(2) Circuit Configuration of Computer Equipment

Figure 7:
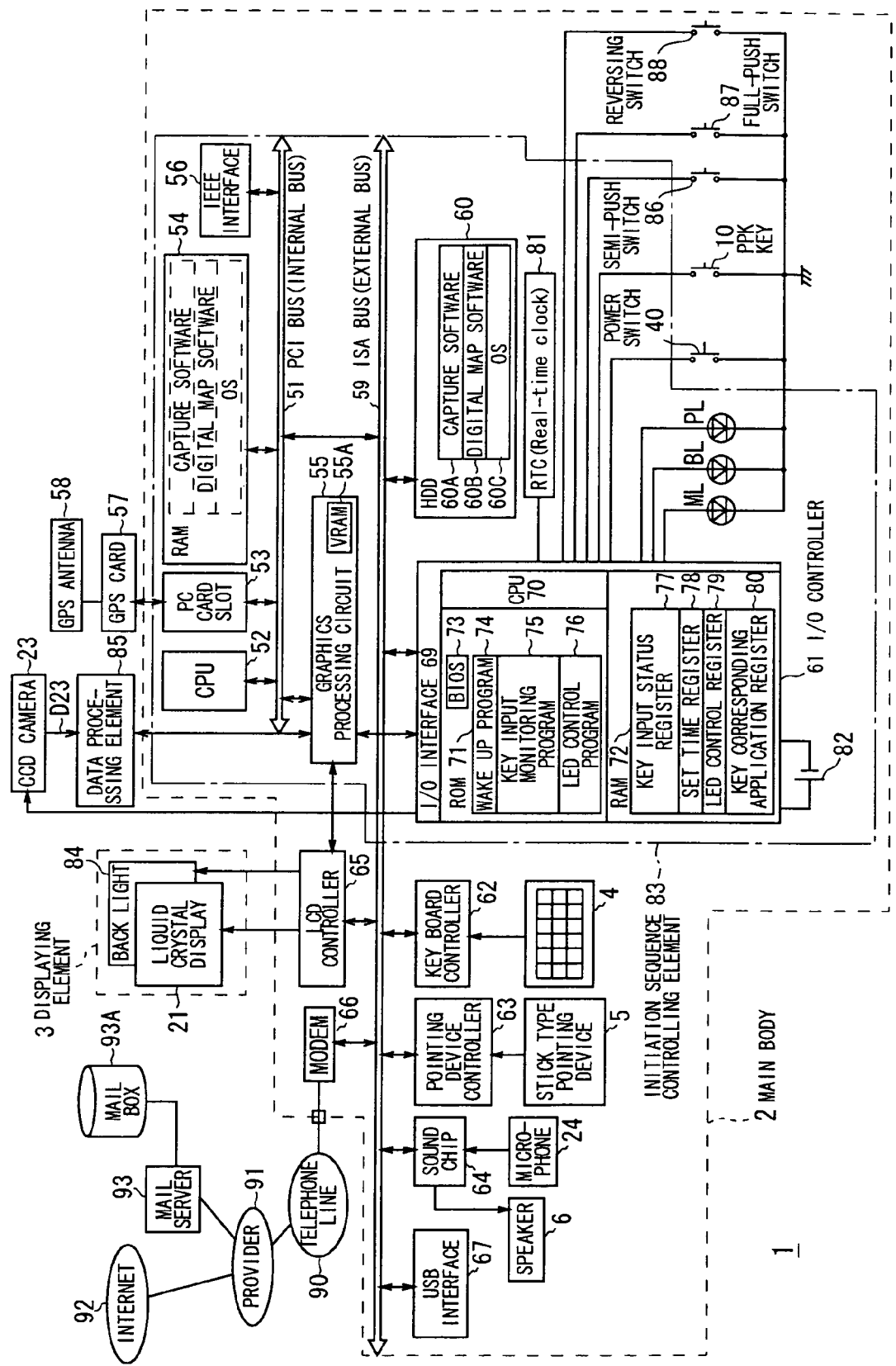
FIG. 7 is a block diagram of a circuit configuration of the computer equipment.

In the main body 2, as shown in FIG. 7, a central processing unit (CPU) 52, a personal computer (PC) card slot 53, a random access memory (RAM) 54, a graphics processing circuit 55 for generating an image to be displayed on the liquid crystal display 21 of the displaying element 3 and an IEEE interface 56 directly coupled to the IEEE 1394 terminal 41 for connecting with other computer equipment and external apparatuses to capture digital data are connected to a peripheral component interconnect (PCI) bus 51 of an initiation sequence controlling element 83.

The CPU 52 is a controller collectively controlling various kinds of functions in the main body 2, and can execute various kinds of functions by running various kinds of programs and applications loaded into the RAM 54.

The PCI bus 51 is connected to an industrial standard architecture (ISA) bus 59, and to the ISA bus 59 are connected a hard Disk drive 60, an In/Out (I/O) controller 61, a keyboard controller 62, a pointing device controller 63, a sound tip 64, a LCD controller 65, a modem 66 and a USB interface 67.

Then, the keyboard controller 62 controls the input of control signals corresponding to the push-down of the operation keys 4 (FIG. 2), and the pointing device controller 63 controls the input of control signals by the stick-type pointing device 5 (FIG. 2).

Furthermore, the sound chip 64 captures the input of voice from the microphone 24 (FIG. 2) or supplies the voice signals to the build-in speaker 6 (FIG. 2), and the modem 66 connects with internet 92 and a mail server 93 having a mail box 93A via a public telephone line 90 and an internet service provider (hereinafter referred to as provider) 91. The USB interface 67 is connected to the USB terminal 42, and peripheral apparatus such as USB mouse and floppy disk drives are connected thereto.

In the hard Disk drive 60, capture software 60A for capturing a static image via the CCD camera 23, digital map software 60B for retrieving on the map, operating system (OS) 60C composed of Windows98™ and various kinds of other application software (not shown) are stored, and they are read by the CPU 52 and loaded in the RAM 54 as appropriate.

The I/O controller 61 is configured by the I/O interface 69, CPU 70, a read only memory (ROM) 71 composed of electrically erasable and programmable read only memory (EEPROM) and the RAM 72 being connected with one another, and current time is constantly provided by a real-time clock (RTC).

A basic input/output system (BIOS) 73, and a wake up program 74, a key input monitoring program 75 and a LED control program 76 are stored in a ROM 71 of the I/O controller 61, and a key input status register 77, a set time register 78, a LED control register 79 and a key corresponding application register 80 are provided on the RAM 72.

The key entry status register 77 stored in the RAM 72 can store an operation key flag, the CPU 70 monitors whether or not the PPK key 10 for one touch operation (FIG. 3) has been pushed down based on the key input monitoring program 75, and stores the operation key flag in the key input status register 77 when the PPK key 10 is pushed down.

Furthermore, the set time register 78 can store time information such as start time optionally set in advance by the user, and CPU 70 detects whether or not current time provided from RTC 81 becomes the start time optionally set on the basis of the wake up program 74, and executes prescribed processing when it becomes the start time.

Furthermore, the key corresponding application register 80 stores correspondence relation between the PPK key 10 and the operation keys 4 composed of multiple combinations thereof and the application to be initiated, corresponding to the PPK key 10 and a prescribed combination of the operation keys 4, and the CPU 70 transmits control data for starting up the corresponding application to the CPU 52 via the ISA bus 59 and the PCI bus 51 in succession and starting up the application corresponding to the control data by the CPU 52 when the PPK key 10 and a prescribed combination of the operation keys 4 are pushed down.

Furthermore, the LED control register 79 stores an end flag when the application stored in the key corresponding application resister 80 is started up and the operation is ended, and the CPU 70 turns on the massage lamp ML when detecting the end flag being stored in the LED control register 79 based on the LED control program 76.

Furthermore, the LED control register 79 stores a power flag when the power switch 40 is pushed down, and stores a battery flag when the main body 2 operates by power voltage supplied from a battery. The CPU 70 therefore turns on the power lamp PL and the battery lamp BL when detecting the power flag or the battery flag being stored based on the LED control program 76.

Then, since a backing-up battery 82 is connected to the I/O controller 61, each of the data of the key input status register 77 of the RAM 72, the set time register 78, LED control register 79 and the key corresponding application register 80 is retained even under the condition that the power switch 40 of the main body 2 turns off and no electric power is supplied from a power source not shown.

Furthermore, a reversing switch 88 connected to the I/O controller 61 is turned on when the photographing element 22 (FIG. 2) is rotated at 180 degrees in the direction in which the other side of the liquid crystal display 21 of the displaying element 3 is picked up, and notifies the CPU 70 of that condition. The PPK key 10 also notifies the CPU 70 of that condition as in the case where the reversing switch 88 is pushed down.

Furthermore, a semi-push switch 86 is turned on and notifies the CPU 70 of the I/O controller 61 of that condition when the shutter button 7 provided on the upper surface of the main body 2 is semi-pushed, and a full-push switch 87 is turned on and notifies the CPU 70 of the I/O controller 61 of that condition when the shutter button 7 is full-pushed.

That is, the CPU 70 of the I/O controller 61, under the condition that the capture software 60A in the hard disk drive 60 is started up, enters into a static image mode, controls the CCD camera 23 and executes the freeze of the static image when the shutter button 7 is semi-pushed by the user, and captures the static image data frozen and transmits the same to a data processing element 85 when the shutter button 7 is full-pushed.

In contrast, the CPU 70 of the I/O controller 61 captures a dynamic image up to maximum of about 60 seconds and transmits the same to the data processing element 85 when entering into a dynamic image mode under the condition that the capture software 60A is not started up.

Furthermore, the I/O controller 61 controls the graphics processing circuit 55 connected to the PCI bus 51 and gives designated data processing to image data composed of static images or dynamic images captured by the CCD camera 23 followed by entering the image data in the graphics processing circuit 55 by a data processing element 85.

The graphics processing circuit 55 stores the supplied image data in a built-in video random access memory (VRAM) 55A and read the same as appropriate, followed by transmitting the image data to the LCD controller 65 and storing the same in the hard disk drive 60 as appropriate.

The LCD controller 65 controls a back light 84 of the displaying element 3 to light up from behind the liquid crystal display 21, and outputs the image data supplied from the graphics processing circuit 55 to the liquid crystal display 21 to display thereon.

On the other hand, the CPU 52 transmits map data with the digital map software 60B to the graphics processing circuit 55 when the digital map software 60B read from the hard disk drive 60 is started up on the RAM 54.

The graphics processing circuit 55 then generates map image data to be displayed on the liquid crystal display 21 based on the supplied map data and stores the same in the VRAM 55A, and reads the data as appropriate and transmits the same to the LCD controller 65.

The LCD controller 65 thereby displays a map image on the liquid crystal display 21 of the displaying element 3 based on the map image data supplied from the graphics processing circuit 55.

Furthermore, the PC card slot 13 connected to the PCI bus 51 is installed as appropriate via the PC card (not shown) and exchanges data with the CPU 52 via the PC card when an optional function is added. For example, when a PCMCIA type global positioning system (GPS) card 57 is installed in the PC card slot 13, it receives radio wave from the GPS satellite via a GPS antenna 58 connected to the GPS card 57 and obtains current location data.

The GPS card 57 thereby transmits the current location data (latitude data, longitude data and altitude data) received via the GPS antenna 58 to the CPU 52 via the PCI bus 51.

In this case, the CPU 52 transmits the current location data to the graphics processing circuit 55, and generates an arrow icon showing the current location based on the current location data by the graphics processing circuit 55, followed by displaying the current location data via the LCD controller 65 under the condition that the arrow icon is placed over the map image in the liquid crystal display 21.

In this way, the liquid crystal display 21 can move and display the arrow icon on the map image on the basis of the location data detected by the GPS card 57.

(3) Configuration of Application Programs Operating on the OS in the Present Invention Then, the OS which is stored in the hard disk in the hard disk drive 60 and loaded into the RAM 54 upon initiation comprises an application program interface (API) (not shown) composed of system function groups for invoking various system functions, and initiates an application program (hereinafter described simply as application) on the OS via API by the CPU 52, thereby displaying an application screen on the liquid crystal display 21.

Furthermore, various kinds of applications operating on the OS configure a character string analyzing and linking system described below, and in the character string analyzing and linking system, various kinds of applications exchange data to operate in connection with each other, thereby comprising the character string analyzing and linking function.

Thus, the CPU 52 performs processing in accordance with various kinds of applications in the character string analyzing and linking system, thereby extracting a character string observed by the user, identifying the type of information represented by the extracted character string (for example, dose the extracted character string represent an address, a telephone number, a postal code, or a map code representing latitude and longitude, or the like?), obtaining the information itself of the identified character string (an address, a telephone number, a postal code or a map code), and supplying and linking the same to the application related to the type of the character string. The configuration of this character string analyzing and linking system will be described in the following.

Figure 8:
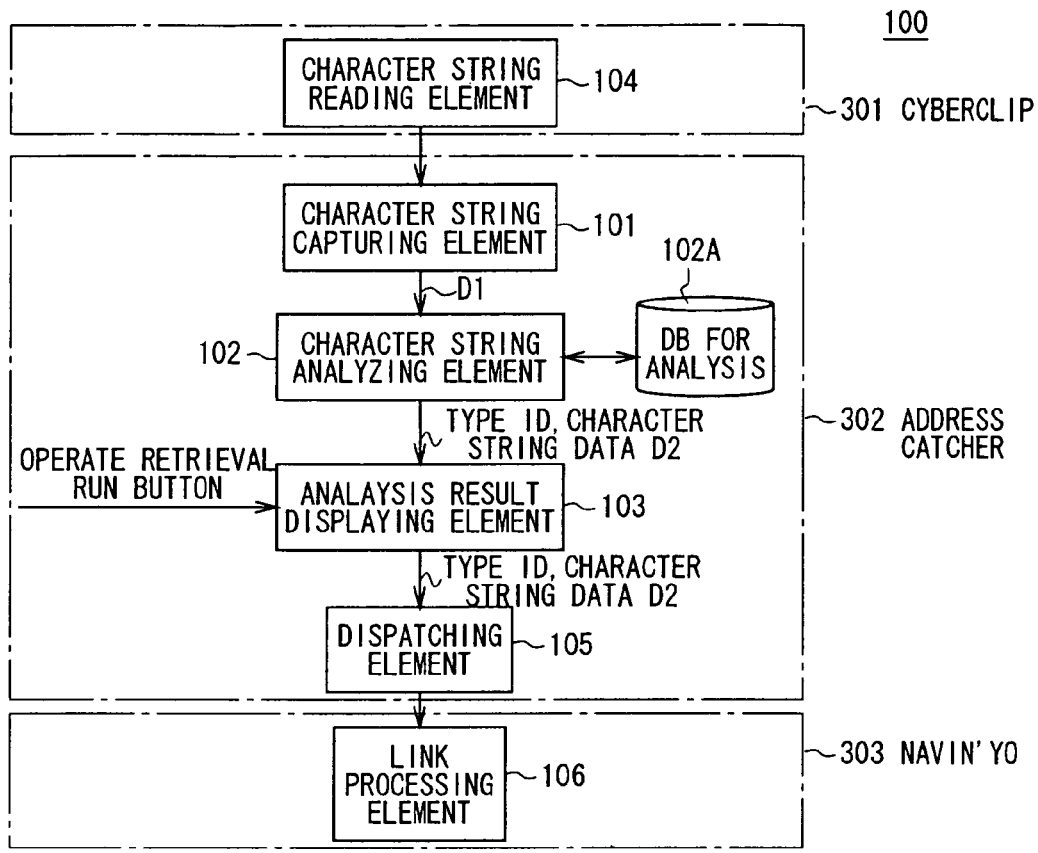
FIG. 8 is a block diagram of configuration of a character string analyzing and linking system according to the present invention.

As shown in FIG. 8, in a character string analyzing and linking system 100, a character string reading element 104, a character string capturing element 101, a character string analyzing element 102, an analysis result displaying element 103, a dispatching element 105 and a link processing element 106 are configured by various kinds of applications operating in parallel on the OS.

That is, then, the module for each application is described by dividing for the purpose of convenience into the character string reading element 104, the character string capturing element 101 to the analysis result displaying element 103 and the dispatching element 105 and the link processing element 106, respectively, and processing for each module is performed by the CPU 52.

Then, in the character string reading element 104, the CPU 52 executes character string read processing in accordance with an application called Cyberclip™ 301 reading character strings in the image as text data.

Furthermore, in the character string capturing element 101 to the analysis result displaying element 103 and the dispatching element 105, the CPU 52 executes character string analysis and supply processing in accordance with an application called Address Catcher™ 302 performing character string analysis and supply processing.

Furthermore, in the link processing element 106, the CPU 52 executes point retrieval processing in accordance with an application (digital map software 60B) called Navin'yo™ retrieving and displaying a point on a map corresponding to the supplied character string data D2.

In fact, in the character string reading element 104, the character string in the image photographed by the CCD camera 23 is read.

Furthermore, in the character string capturing element 101, the character string read is monitored, and the character string is captured as a character string D1 and transmitted to the character string analyzing element 102 when the cursor is placed over the character string to designate it. Then, the specific process of reading the character string by the character string reading element 104 and the specific process of capturing the character string by the character string capturing element 101 will be described below.

The character string analyzing element 102, which is connected to for example an address data base, a telephone number data base, a postal code data base, a map code data base and the analysis data base 102A including a number of data bases other than these data bases, compares and refers the character string D1 supplied from the character string capturing element 101 to the data read from the analysis data base 102A.

The character string analyzing element 102 thereby determines the type of information (address, telephone number, postal code or map code) represented by the supplied character string D1 and generates a type ID corresponding to the type of information, followed by taking out the character string data D2 that is the information itself represented by the character string D1 (data of address, telephone number, postal code or map code itself) and transmitting the type ID and the character string data D2 to the analysis result displaying element 103.

The analysis result displaying element 103 generates a prescribed analysis result displaying screen including the type of information and the character string data D2 (described later) to display the same on the liquid crystal display 21 based on the type ID and the character string data D2 supplied from the character string analyzing element 102, thereby allowing the user to recognize the type of information represented by the character string D1.

Furthermore, the analysis result displaying element 103 transmits the type ID and the character string data D2 retained thereby to the dispatching element 105 when the retrieval run button (described later) displayed on the analysis result displaying screen is pushed down by the user.

The dispatching element 105 reads the digital map software 60B (Navin'yo 303) related to the type ID supplied from the analysis result displaying element 103 by the hard disk drive 60 and starts up the same on the RAM 54, followed by supplying the character string data D2 to the digital map software 60B.

The link processing element 106 links the digital map software 60B to the character string data D2 since the character string data D2 have been supplied to the digital map software 60B initiated by the dispatching element 105.

The link processing element 106 thereby retrieves a point on map corresponding to the character string data D2 of analysis result (data of address, telephone number, postal code or map code) in accordance with the digital map software 60B (Navin'yo 303), and generates a map screen including the retrieved point to display the same on the liquid crystal display 21.

Figure 9:
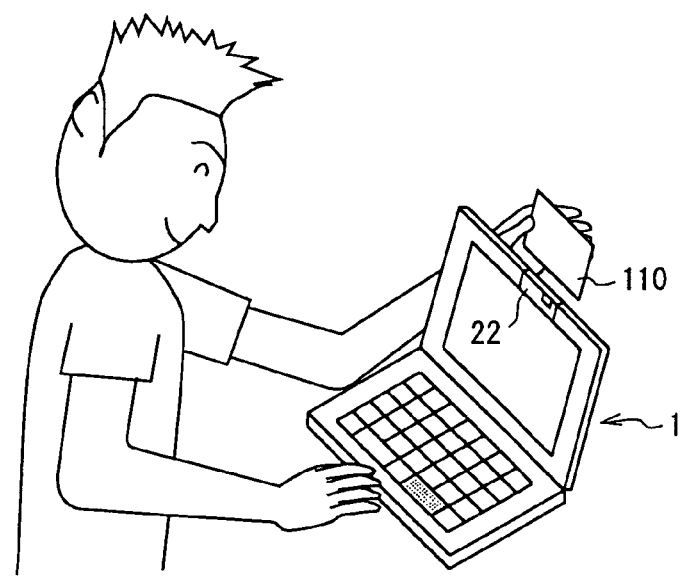
FIG. 9 is a schematic diagram of a name card being photographed by a CCD camera.

(3-1) Analysis Processing and Application Link Processing of the Character String in the Image Photographed by the CCD Camera Actually, in the computer equipment 1, as shown in FIG. 9, when the shutter button 7 is pushed down with the photographing element 22 (FIG. 2) of the displaying element 3 faced to the back of the liquid crystal display 21, and with a name card 110 held by the user and the CCD camera 23 (not shown) of the photographing element 22 opposite to each other, the name card 10 is photographed. Although the name card 110 is used here, any material such as books and post cards in which letters are written may be used.

Figure 10:
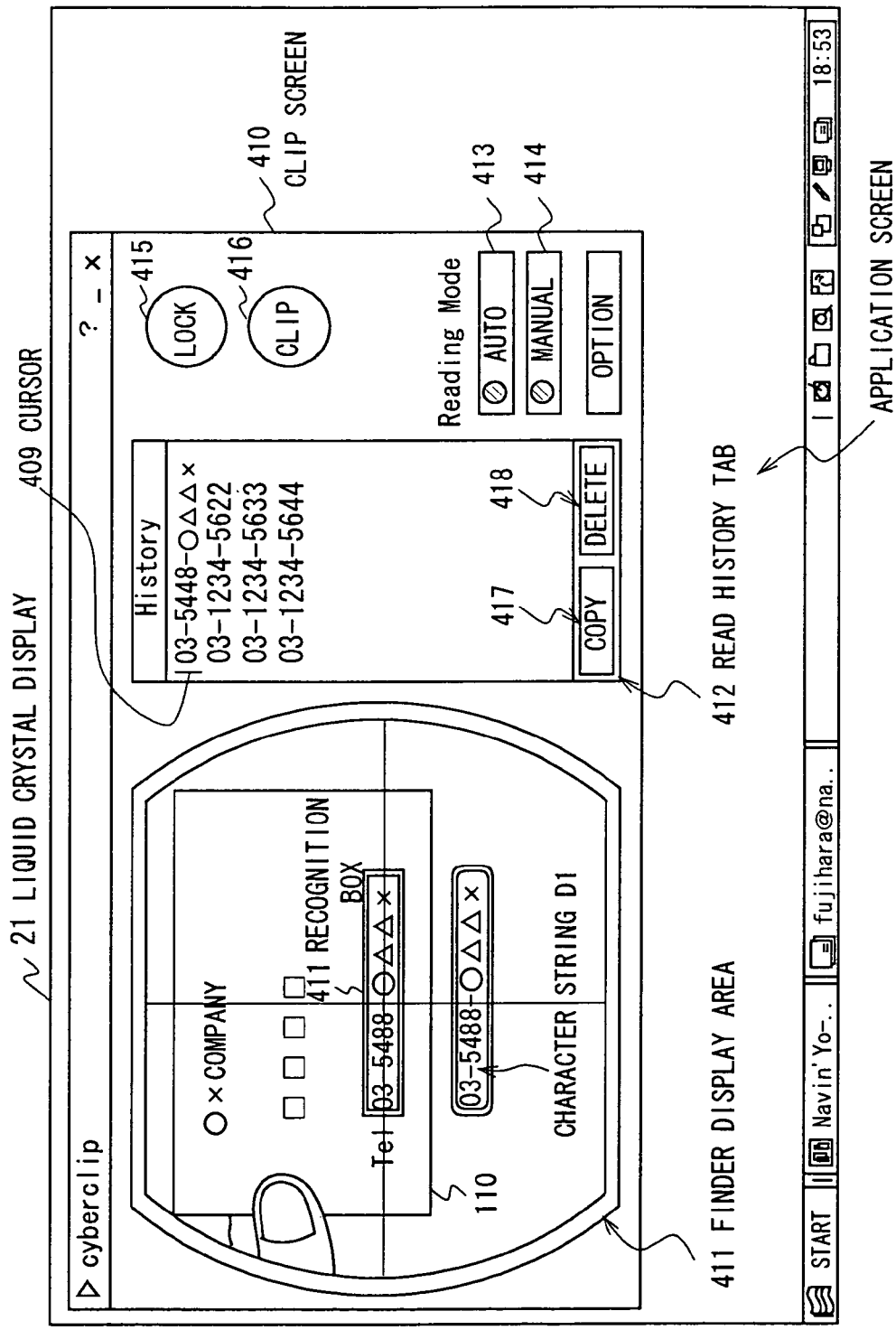
FIG. 10 is a schematic diagram of a clip screen.

The computer equipment 1 then displays the image of the name card 110 photographed by the CCD camera 23 in the application image of the liquid crystal display 21 via the data processing element 85 (FIG. 7), the graphics processing circuit 55 and the LCD controller 65, as a clip screen 410 as shown in FIG. 10.

On this clip screen 410 are provided a finder shaped finder display area 411 photographing the name card 110 being photographed by the CCD camera 23, a read history tab 412 registering and displaying the character string D1 read via the CCD camera 23 downward in an order in which the newest is the first, an auto mode button 413 switching the read mode and a manual mode button 414.

In the clip screen 410, the user selects the auto mode by the auto mode button 413, sets the character string which he or she wants to read ("03-5448-O∆∆X") in a recognition box 411A almost in the center of the finder display area 411, and performs focus adjustment via the adjustment ring 25 (FIG. 3).

Then, the character string reading element 104 of the system 100 corresponding to the type of information recognizes and reads the character string in image set in the recognition box 411A ("03-5448-O∆∆X") by for example an optical character reader (OCR) equipment, and registers and displays the same in the read history tab 412 as a character string D1.

Furthermore, the character string reading element 104 registers and displays the character string D1 read ("03-5448-O∆∆X") in the top line of the read history tab 412. Furthermore, if a cursor 409 is positioned outside the clip screen 410, the character string reading element 104 automatically moves and positions the cursor 409 over the character string D1. In this case, the cursor 409 is moved to just left to "0," the leading (left end) letter of the character string D1, and is recognized as being placed over the character string D1 under this condition.

Furthermore, in the clip screen 410 in FIG. 10, if another character string D1 is read and added in the top line in the read history tab 412, the position of the cursor 409 is not moved, the character string D1 ("03-5448-O∆∆X") readjust before is displayed on the line Just a line below the top line step, and the cursor 409 is positioned on the newest character string D1. That is, the cursor 409 has been moved relative to the character string D1 ("03-5448-O∆∆X") read just before.

In this connection, in the clip screen 410, the manual mode can be selected by the manual mode button 414, and in this case the size of the recognition box 411A and the position of the recognition box 411A can be changed by dragging the recognition box 411A almost in the center of the finder display area 411.

The user sets the character string D1 in the recognition box 411A to perform focus adjustment, clicks under this condition a lock button 415 to fix the character string D1 to be recognized, and then clicks a clip button 416, thereby making it possible to read the character string D1 and register and display the same in the top line of the read history tab 412.

In addition, if the character string D1 displayed on the read history tab 412 on the clip screen 410 is to be deleted, it can be achieved by positioning the cursor on the character string D1 to be deleted and clicking a delete button 418, and if the character string D1 is to be copied for use, it can be achieved by positioning the cursor on the character string D1 to be copied and clicking a copy button 417.

Then, in the clip screen 410, when the cursor 409 is placed over the character string D1 displayed on the top line of the read history tab 412 and a prescribed time (for example 1 second) or more passes, the character string analyzing and linking system 100 captures the entire character string D1 over which the cursor is placed by the character string capturing element 101, and transmits the same to the character string analyzing element 102. Although the character string D1 is captured in the character string analyzing and linking system 100 when the cursor 409 is placed over the character string D1 and one second or more passes, elapsed time is not limited to one second but can be changed depending on setting.

The OS then performs regeneration in order to prevent a covered part of the character string D1 from being put out of sight by the cursor 409 when the cursor is placed over the character string, while the character string D1 supplied again to the API from the application is captured by the character string capturing element 101 when this regeneration is performed.

The character string analyzing element 102 determines the type of information represented by the character string D1 (the type of the character string D1 in this case is telephone number) and generates the type ID by comparing and referring the character string D1 ("03-5448-O∆∆X") supplied from the character string capturing element 101 to the format of data read from the character string analysis data base 102A, followed by extracting the part of character string data D2 corresponding to telephone number (i.e. "03-5448-O∆∆X") and transmitting the ID and the character string data D2 ("03-5448-O∆∆X") to the analysis result displaying element 103.

Figure 11:
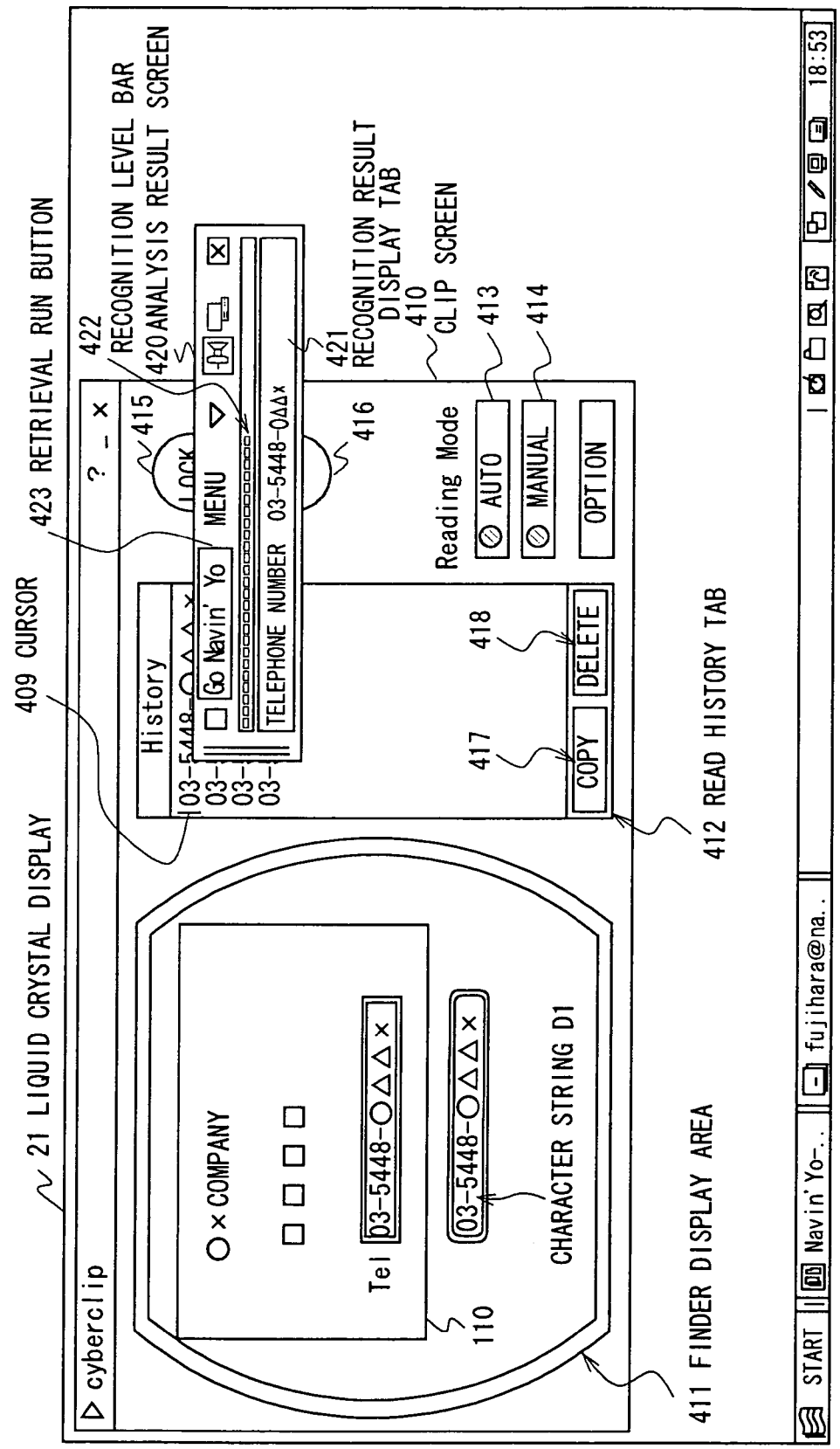
FIG. 11 is a schematic diagram of character string analysis result screen.

The analysis result displaying element 103 generates a prescribed analysis result screen 420 including the type of information corresponding to the type ID and the character string data D2 and displays the same near the character string D1 in the read history tab 412 as shown in FIG. 11.

Then, in the analysis result screen 420, the result of analysis ("03-5448-O∆∆X") is displayed on a recognition result displaying tab 421, thereby making the user recognize the fact that the type of information represented by the character string D1 over which the cursor is placed is "telephone number" and the telephone number itself is "03-5448-O∆∆X."

Furthermore, in the analysis result screen 420, a recognition level bar 422 showing recognition level for the result of analysis is displayed on the recognition result displaying tab 421 wherein accuracy of the result of analysis increases as this recognition level bar 422 swings right, thus allowing the user to recognize the accuracy of the result of analysis at first sight.

Furthermore, in the analysis result screen 420, a retrieval run button 423 is displayed on the upper line of the recognition level bar 422, and when the retrieval run button 423 is clicked by the user, the analysis result displaying element 103 transmits the type ID and the character string data D2 that have been retained to the dispatching element 105 (FIG. 8) with the click operation of the retrieval run button 423 as trigger.

When an application corresponding to the type ID is stored in the hard disk in the hard disk drive 60, the dispatching element 105 starts up the digital map software 60B (Navin'yo 303) which is the application corresponding thereto on the RAM 54, and supplies the character string data D2 to the digital map software 60B.

Figure 12:
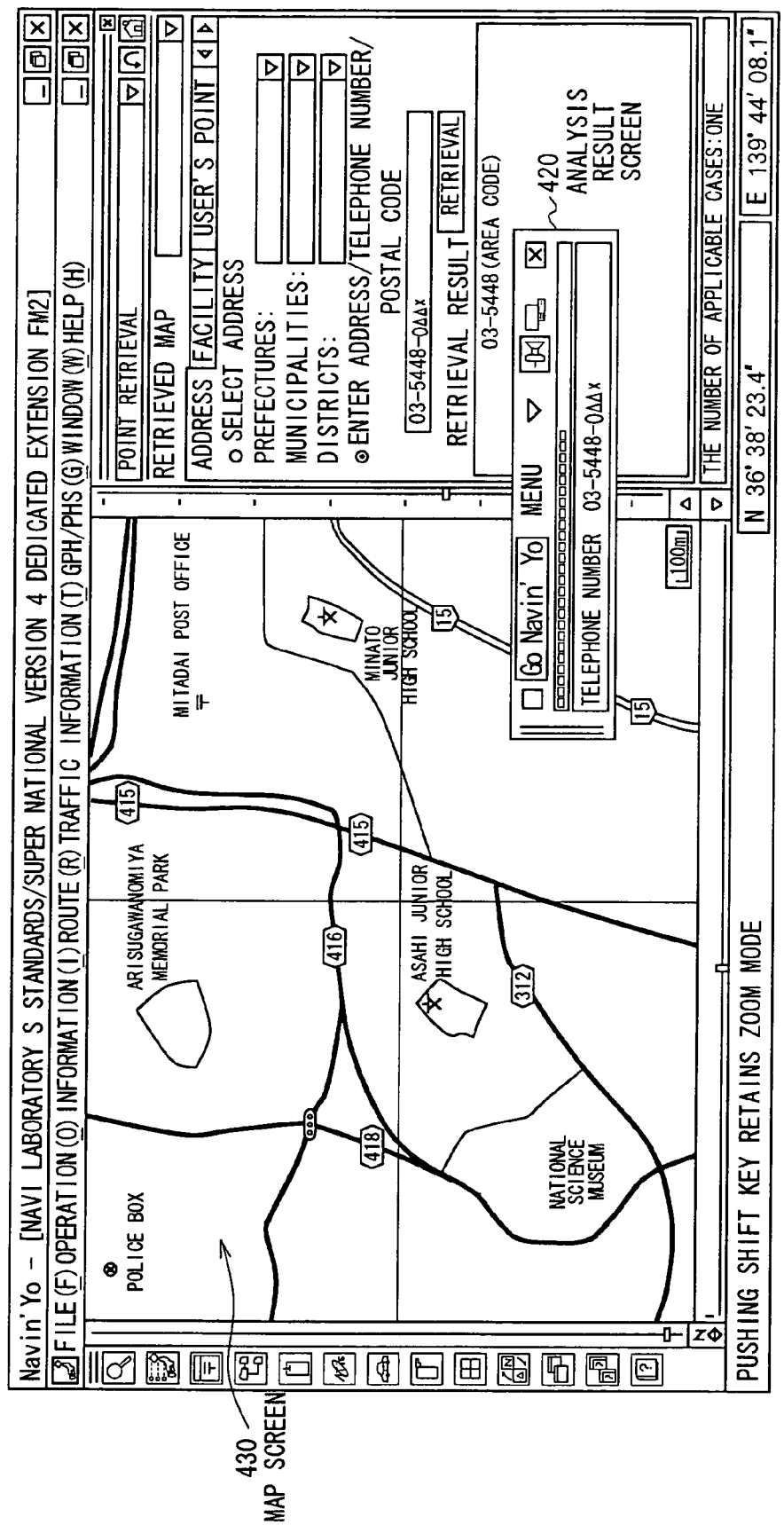
FIG. 12 is a schematic diagram of a map screen of an analysis result.

The link processing element 106 links the digital map software 60B (Navin'yo 303) that has been started up with the character string data D2, retrieves a point on map corresponding to the character string data D2 ("03-5448-O∆∆X") in accordance with the digital map software 6B (Navin'yo 303), and generates a map screen 430 of the area including the retrieved position and displays the same on the liquid crystal display 21 as shown in FIG. 12.

In this map screen 430, a point on map including the area code of "03-5448" which is the result of analysis of the character string D1 is displayed, and the analysis result screen 420 is also displayed thereon. However, the link processing element 106 refers the character string data D2 ("03-5448-O∆∆X") to the point data base of the digital map software 60B, and if a building or a facility fully matched therewith exists, displays the point on the place crossed by the cursor.

Furthermore, the dispatching element 105 cannot start up the digital map software 60B (Navin'yo 303) and supply the character string data D2 until the user clicks the retrieval run button 423 on the analysis result screen 420 shown in FIG. 11.

Accordingly, the user may click the retrieval run button 423 on the analysis result screen 420 if he or she intends to link the digital map software 60B with the result of analysis of the character string D1, and may proceed to next analysis processing of the character string D1 without clicking the retrieval run button 423 if he or she does not intend to link the digital map software 60B.

Figure 13:
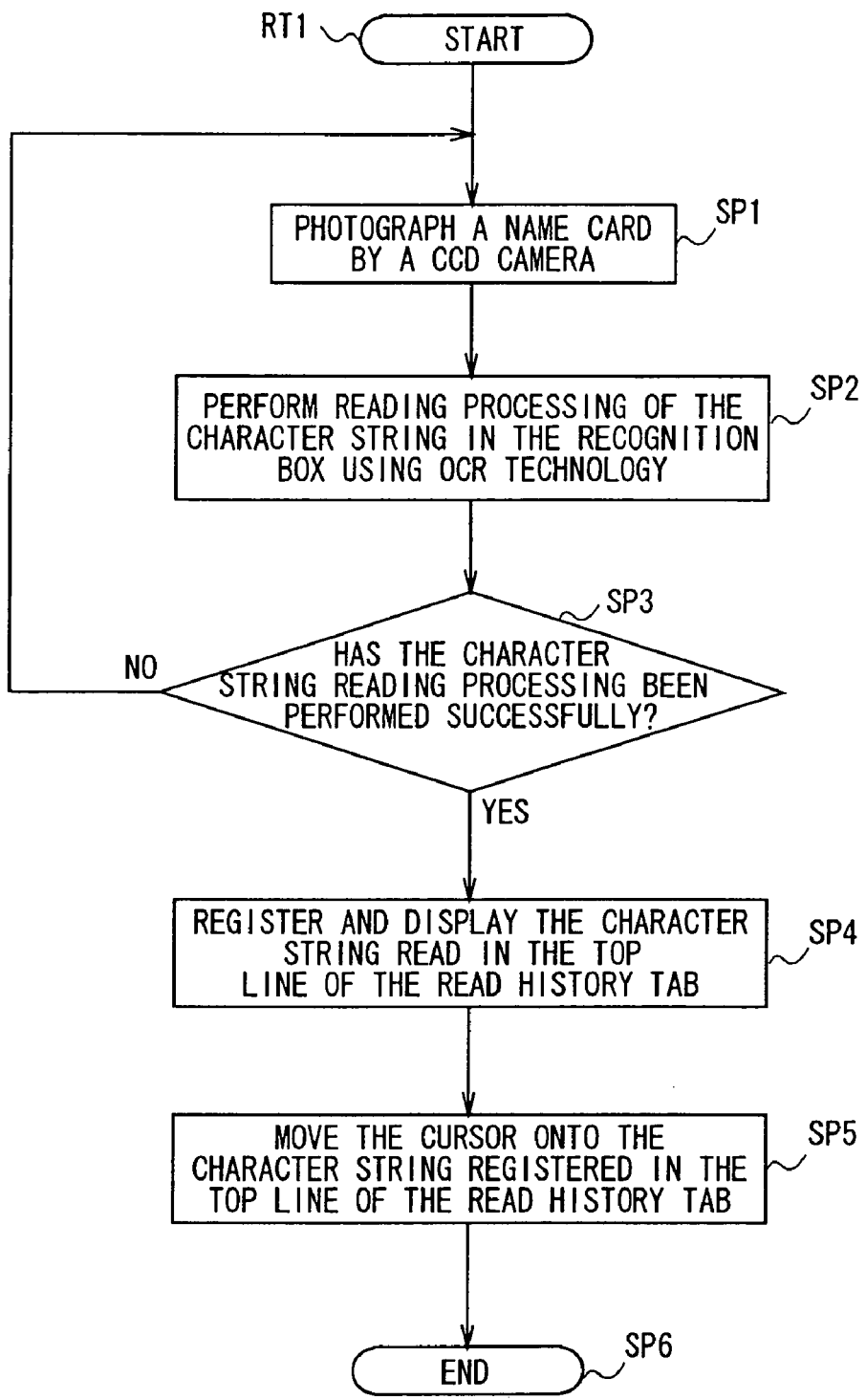
FIG. 13 is a flow chart of a reading processing procedure of reading the character string in the image photographed by the CCD camera.

Next, the character string read processing procedure of recognizing and reading the character string D1 from the image of the name card 110 photographed by the aforesaid CCD camera 23 will be described. In this case, the CPU 52 executes character string read processing for the flow chart shown in FIG. 13 in accordance with the application of the Cyberclip 301 in the character string reading element 104.

The CPU 52 first enters into a step of starting routine RTI, and then proceeds to a step of SPI. The CPU 52 in the step of SPI enters into processing of the character string reading element 104, and then proceeds to a next step of SP2 when the name card 110 is photographed with the CCD camera 23 by the user operating shutter button 7.

In the step of SP2, the CPU 52 executes processing of reading the character string D1 set in the recognition box 411A of the finder display area 411 using the OCR equipment, and then proceeds to a step of SP3.

In the step of SP3, the CPU 52 determines whether or not the processing of reading the character string D1 in the step of SP2 has been successfully done. If a negative result is obtained, it indicates that focus is not adjusted or that the character string D1 has not been read because it was not set in the recognition box 411A correctly, and the CPU 52 then returns to the step of SP1 and repeats the aforesaid processing.

In contrast, if a positive result is obtained in the step of SP3, it indicates that the character string D1 set in the recognition box 411A from the image of the name card 110 photographed has been successfully read, and the CPU 52 then proceeds to a next step of SP4.

In the step of SP4, CPU 52 registers and displays the character string D1 that has been read in the top line of the read history tab 412 in the clip screen 410, and then proceeds to a next step of SP5.

In the step of SP5, the CPU 52 move the cursor 409 to on the character string D1 registered in the top line of the read history tab 412, and then proceeds to a next step of SP6 for ending the character string read processing procedure.

Figure 14:
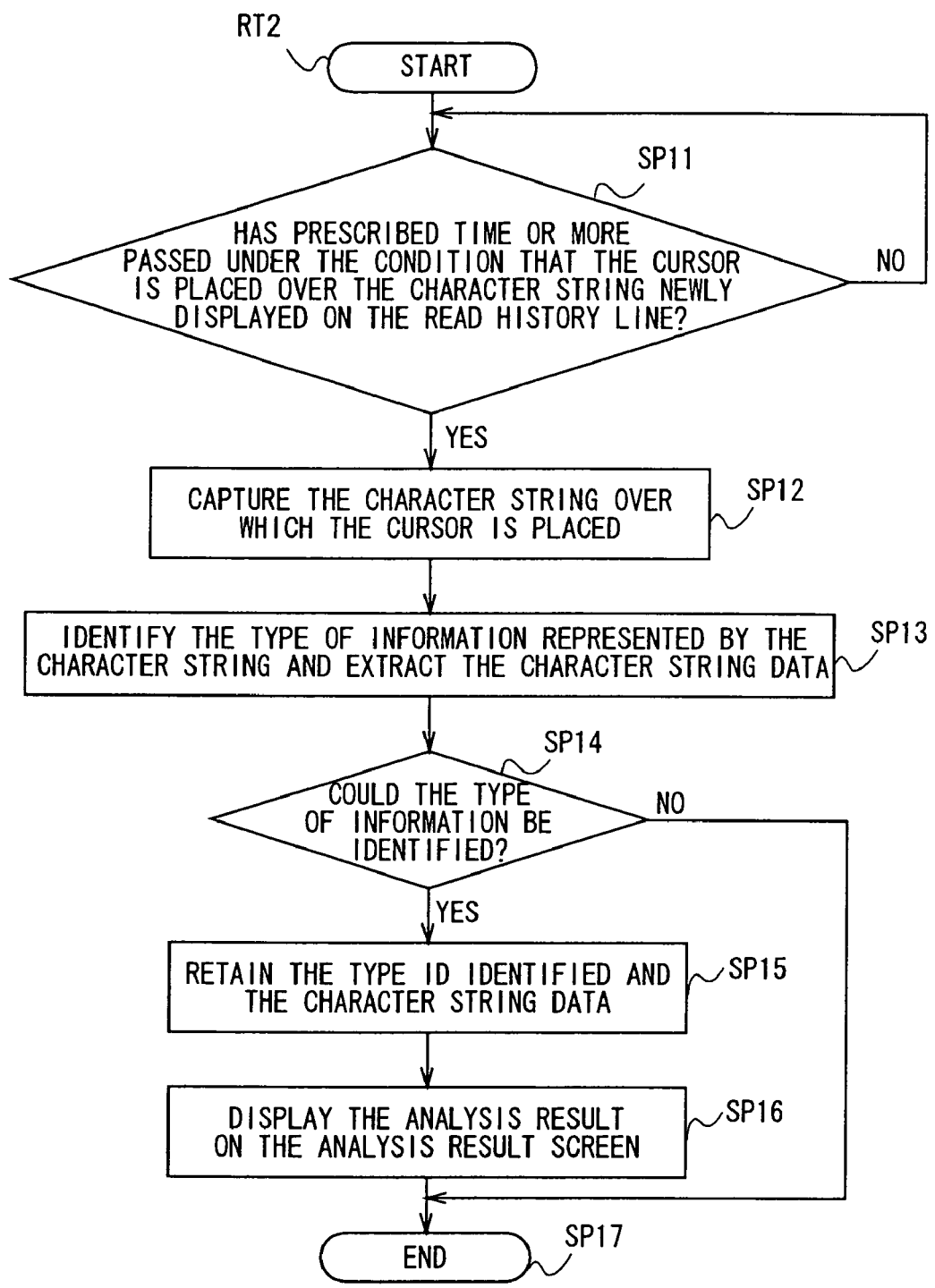
FIG. 14 is a flow chart of a character string analysis processing procedure.

Next, the character string analysis processing procedure of capturing and analyzing the character string D1 read by the character string read processing procedure of the aforesaid routine RTI (FIG. 13) will be described. In this case, the CPU 52 executes character string analysis processing for the flow chart shown in FIG. 14 in accordance with the application of Address Catcher 302 in the character string capturing element 101 to the analysis result displaying element 103.

The CPU 52 first enters into a step of starting routine RT2 and then proceeds to a step of SP11. When the CPU 52 enters into processing in the character string capturing element 101 in the step of SP11, the CPU 52 determines whether or not prescribed time or more has passed under the condition that the cursor 409 is placed over a new character string D1 displayed on the read history tab 412 of the clip screen 410.

If a negative result is obtained here, it indicates that the cursor 409 has been already moved before prescribed time or more passes under the condition that the cursor 409 is placed over the character string D1, and the CPU 52 then returns to the step of SP11.

In contrast, if a positive result is obtained in the step of SP11, it indicates that prescribed time or more has passed under the condition that the cursor 409 is placed over the character string D1 in the read history tab 412, namely, the user intends to analyze the character string D1 over which the cursor 409 is placed, and the CPU 52 then proceeds to a next step of SP12.

In the step of SP12, the CPU 52 captures the character string D1 over which the cursor 409 is placed and proceeds to a next step of SP13.

When the CPU 52 enters into the character string analyzing element 102 in the step of SP13, the CPU 52 executes identification of the type ID representing the type of information represented by the character string D1 and extraction processing for character string data D2 by comparing and referring the character string D1 that has been captured to the data of the analysis data base 102A, and then proceeds to a next step of SP14.

In the step of SP14, the CPU 52 determines whether or not the type of information represented by the character string D1 has been successfully identified. If a negative result is obtained here, it indicates that the character string D1 is not any of address, telephone number, postal code and map code as a result of comparing and referring to the data of the analysis data base 102A, and the type of information represented by the character string D1 has not been identified, and the CPU 52 then proceeds to a step of SP17 for ending the character string analysis processing.

In contrast, if a positive result is obtained in the step of SP14, it indicates that the type of information represented by the character string D1 has been identified as "telephone number," and the CPU 52 then enters into processing in analysis result displaying element 103 and proceeds to a next step of SP15.

In the step of SP15, the CPU 52 retains the type ID of the character string D1 and the character string data D2, and then proceeds to a next step of SP16.

In the step of SP16, the CPU 52 generates the analysis result screen 420 on the basis of the type ID of the character string D1 and the character string data D2, displays the same near the character string D1 on the clip screen 410 (FIG. 11), and then proceeds to a next step of SP17 for ending the character string analysis processing procedure.

Figure 15:
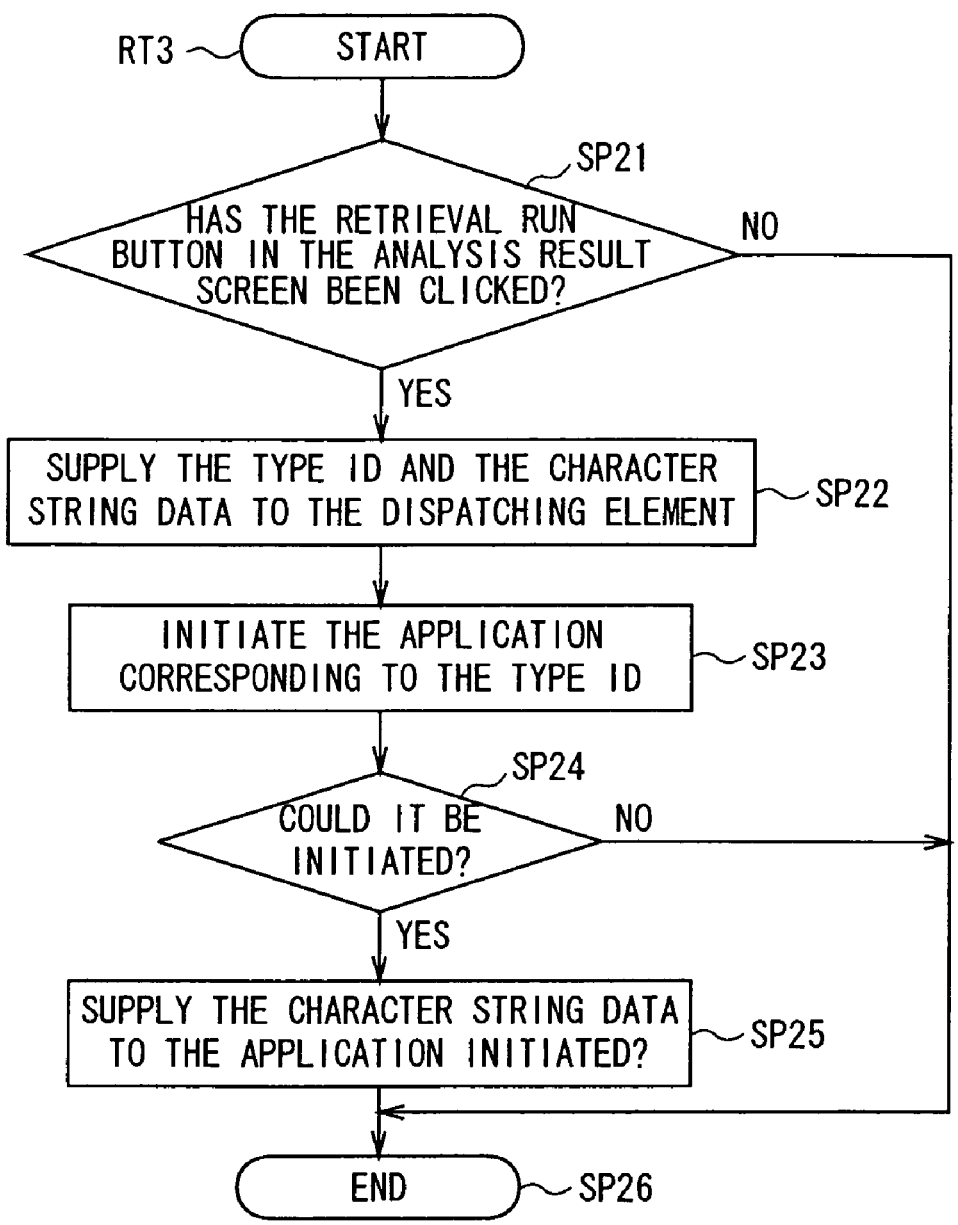
FIG. 15 is a flow chart of an analysis result supply processing procedure.

Then, analysis result supply processing procedure of delivering the character string data D2 obtained by the character string analysis processing procedure of the aforesaid routine RT2 (FIG. 14) to the digital map software 60B (Navinyo 303) performing point retrieval using the character string data D2 will be described. In this case, the CPU 52 executes analysis result supply processing for the flow chart shown in FIG. 15 in accordance with the application of Address Catcher 302 in the analysis result displaying element 103 and the dispatching element 105.

The CPU 52 first enters into a step of starting routine RT3 and then proceeds to a step of SP21. When the CPU 52 enters into the analysis result displaying element 103 in the step of SP21, the CPU 52 determines whether or not the retrieval run button 423 in the analysis result screen 420 (FIG. 11) has been clicked.

If a negative result is obtained here, it indicates that the retrieval run button 423 in the analysis result screen 420 has not been clicked and the user does not intend to execute retrieval processing using the character string data D2, and the CPU 52 then proceeds to a step of SP26 for ending the analysis result supply processing.

In contrast, if a positive result is obtained in the step of SP21, it indicates that the retrieval run button 423 in the analysis result screen 420 has been clicked and the user intends to execute retrieval processing using the character string data D2, and the CPU 52 then proceeds to a next step of SP22.

In the step of SP22, the CPU 52 supply the type ID and the character string data D2 retained by the analysis result displaying element 103 to the dispatching element 105 (FIG. 8), and then proceeds to a next step of SP23.

When the CPU 52 enters into processing in the dispatching element 105 in the step of SP23, the CPU 52 initiates the digital map software 60B (Navin'yo 303), an application corresponding to the type ID by the hard disk drive 60, and then proceeds to a next step of SP24.

In the step of SP24, the CPU 52 determines whether or not the digital map software 60B (Navin'yo 303), an application corresponding to the type ID has been initiated. If a negative result is obtained here, it indicates that the digital map software 60B (Navin'yo 303) corresponding to the type ID dose not exist and therefore it could not be initiated, and the CPU 52 proceeds to a step of SP26 for ending the analysis result supply processing.

In contrast, if a positive result is obtained in the step of SP24, it indicates that the digital map software 60B (Navin'yo 303) has been initiated, and the CPU 52 then proceeds to a next step of SP25.

In the step of SP25, the CPU 52 supplies the character string data D2 (03-5448-OΔΔX) to the digital map software 60B (Navin'yo 303) initiated in the step of SP24, and then proceeds to the next step of SP26 for ending the analysis result supply processing procedure.

Figure 16:
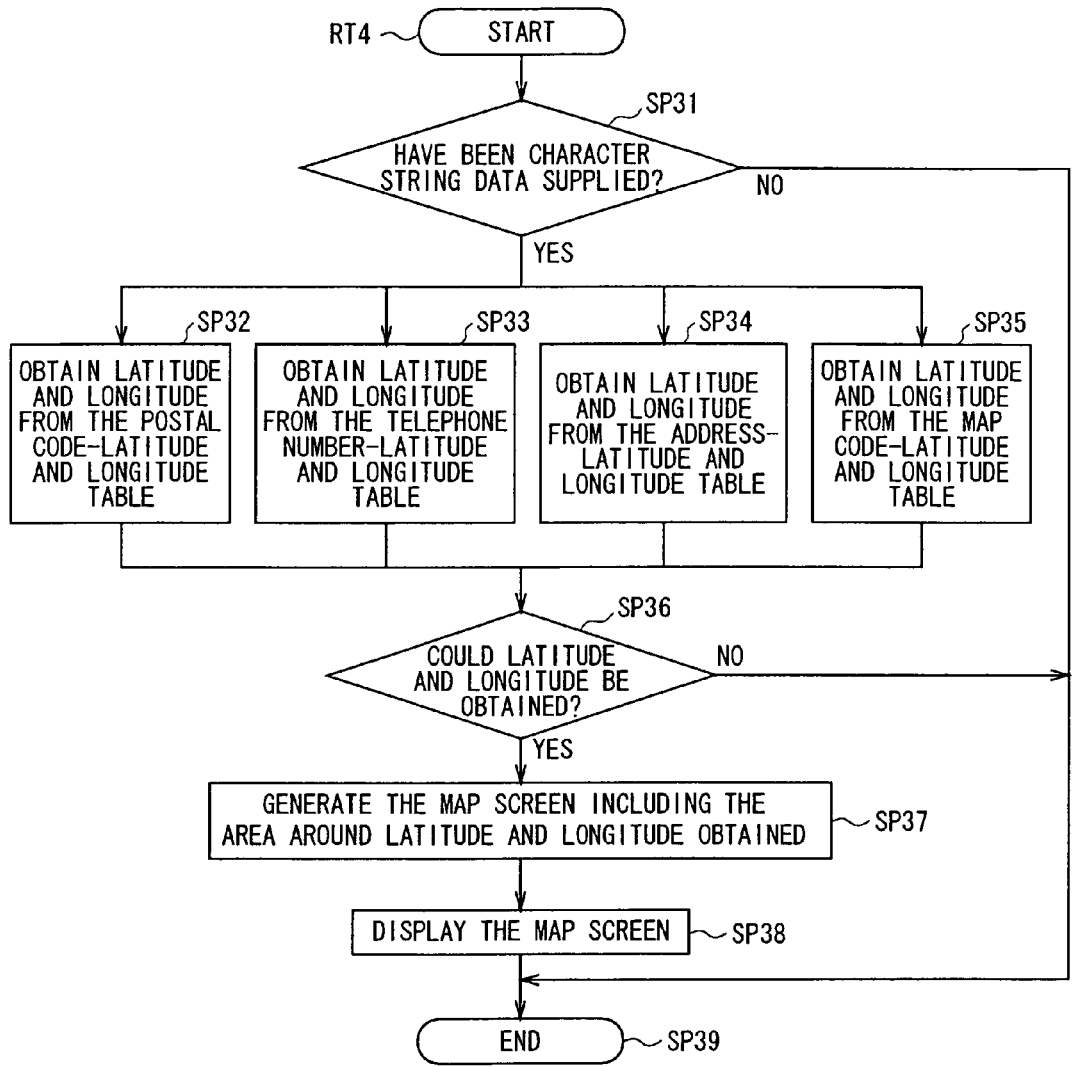
FIG. 16 is a flow chart of an application link processing procedure.

Finally, application link processing procedure of retrieving a point on map corresponding to the telephone number of the character string data D2 supplied by the step of SP25 in the aforesaid analysis result supply processing procedure of the routine RT3 (FIG. 15) in accordance with the digital map software 60B (Navin'yo 303) and displaying a map screen 430 corresponding to the result of analysis will be described. In this case, the CPU 52 executes application link processing for the flow chart shown in FIG. 16 in accordance with the application of Navin'yo 303 in the link processing element 106.

The CPU 52 first enters into a starting step of routine RT4 and then proceeds to a step of SP31. When the CPU 52 enters into processing in the link processing element 106 in the step of SP31, the CPU 52 determines whether or not the character string data D2 have been supplied to the digital map software 60B which is the application corresponding to the type ID. If a negative result is obtained here, it indicates that the character string data D2 have not been supplied, and the CPU 52 then proceeds to a step of SP39 for ending the application link processing.

In contrast, if a positive result is obtained in the step of SP31, it indicates that the character string data D2 have been supplied to the digital map software 60B, and the CPU 52 then proceeds to one of next steps of SP32 to SP35.

In this case, the CPU 52 recognizes that the character string data D2 of telephone number (O3-5448-OΔΔX) have been supplied, and therefore proceeds to the step of SP33. In this connection, the CPU 52 proceeds to the step of SP32 if the character string data D2 of postal code are supplied, proceeds to the step of SP34 if the character string data D2 of address are supplied, and proceeds to the step of SP35 if the character string data D2 of map code are supplied.

In the step of SP33, the CPU 52 retrieves and acquires the latitude and longitude corresponding to the telephone number of the character string data D2 from the telephone number— latitude and longitude table by the hard disk drive 60, and then proceeds to a next step of SP36.

In the step of SP36, the CPU 52 determines whether or not the latitude and longitude corresponding to the telephone number of the character string data D2 (O3-5448-O∆∆X) has been acquired. If a negative result is obtained here, it indicates that the latitude and longitude corresponding to the character string data D2 is not registered in the telephone number-latitude and longitude table and therefore has not been acquired, and the CPU 52 then proceeds to a step of SP39 for ending the application link processing.

In contrast, if a positive result is obtained in the step of SP36, it indicates that the latitude and longitude corresponding to the character string data D2 has been acquired, and the CPU 52 then proceeds to a next step of SP37.

In the step of SP37, the CPU 52 retrieves a spot on the map around the latitude and longitude corresponding to the character string data D2 (telephone number) in accordance with the digital map software 60B (Navin'yo 303), generates a map screen 430 of the area including the spot, and then proceeds to a next step of SP38.

In the step of SP38, the CPU 52 displays the map screen 430 on the liquid crystal display 21, and then proceed to the next step of SP39 for ending the application link processing.

(3-2) Analysis Processing and Application Link Processing of the Character String Over which the Cursor is Placed.

Furthermore, in the computer equipment 1, when the cursor is placed over the character string on the application screen of the liquid crystal display by the user's mouse operation and prescribed time (for example a second) or more passes thereafter, the character string D1 corresponding to several letters before and after the part over which the cursor is placed is captured and transmitted to the character string analyzing element 102 by the character string capturing element 101 (FIG. 8).

Figure 17:
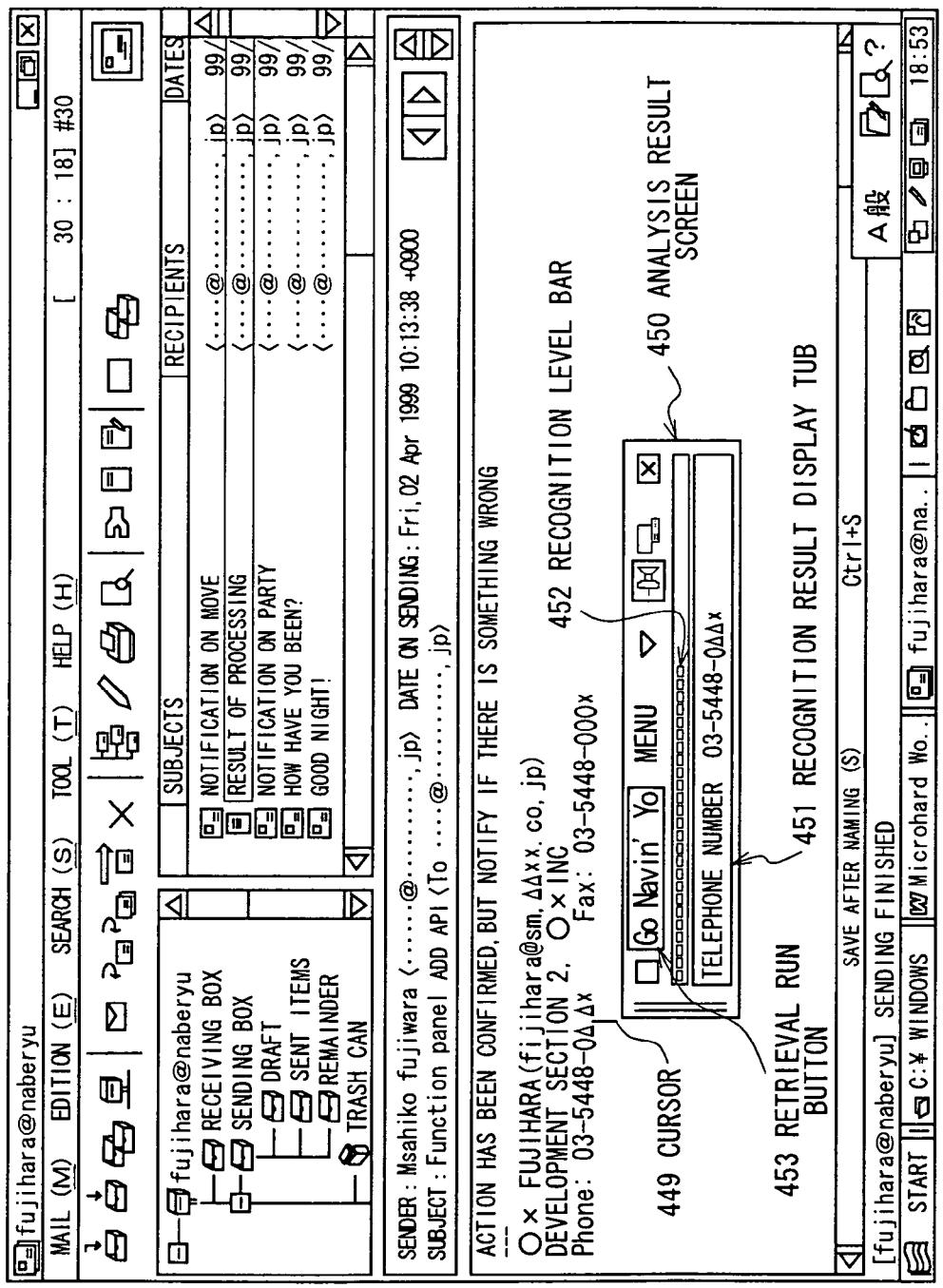
FIG. 17 is a schematic diagram of the analysis result screen of the character string appointed by a cursor.

As shown in FIG. 17, for example, when a cursor 449 is placed over the character string of "phone: 03-5448-O∆∆X" displayed on the application screen, the character string capturing element 101 captures the character string D1, "Phone: 03-5448-O∆∆X" corresponding to several letters before and after the part over which the cursor 449 is placed and transmits the same to the character string analyzing element 102. Although the range of the several letters in the character string D1 to be captured by the character string is prescribed in this case, its setting can be changed optionally.

The character string analyzing element 102 compares and refers the character string D1 ("Phone: 03-5448-O∆∆X") supplied from the character string reading element 101 to the format of data read from the analysis data base 102A, thereby identifying the type of information represented by the character string D1 (the type of character string D1 in this case is telephone number) and generating the type ID, thereby extracting the part of character string data D2 corresponding to telephone number (i.e. "03-5448-O∆∆X") and transmitting the type ID and the character string data D2 ("03-5448-O∆∆X") to the analysis result displaying element 103.

The analysis result displaying element 103 generates the designated analysis result screen 450 including the type of information corresponding to the type ID and the character string data D2, and displays the same near the character string D1 appointed by the cursor 449.

Here, in the analysis result screen 450, an analysis result, "Phone: O3-5448-O∆∆X" is displayed on a recognition result display tab 451 as in the case of the analysis result screen 420 shown in FIG. 11, thereby making the user recognize that the type of information represented by the part of character string D1 over which the cursor 449 is placed is "telephone number" and the telephone number itself is "03-5448-O∆∆X."

Also, in the analysis result screen 450, a recognition level bar 452 showing recognition level for the result of analysis is displayed on the recognition result display tab 451 as in the case of the analysis result screen 420, wherein accuracy of the result of analysis increases as this recognition level bar 452 swings right, thus allowing the user to recognize the accuracy of the result of analysis at first sight.

Furthermore, in the analysis result screen 450, a retrieval run button 453 is displayed on the upper line of the recognition level bar 452 as in the case of the analysis result screen 420, and when the retrieval run button 423 is clicked by the user, the analysis result displaying element 103 transmits the type ID and the character string data D2 that have been retained to the dispatching element 105 with the click operation of the retrieval run button 453 as trigger.

When an application corresponding to the type ID is stored in the hard disk in the hard disk drive 60, the dispatching element 105 starts up the digital map software 60B (Navin'yo 303), the application corresponding thereto, and supplies the character string data D2 ("O3-5448-O∆∆X") to the digital map software 60B.

The link processing element 106 thereby retrieves a point on map corresponding to the character string data D2 ("O3-5448-O∆∆X") in accordance with the digital map software 60B (Navin'yo 303), and displays the same on the liquid crystal display 21 as a map screen 430 of the area including the point retrieved (FIG. 12).

Figure 18:
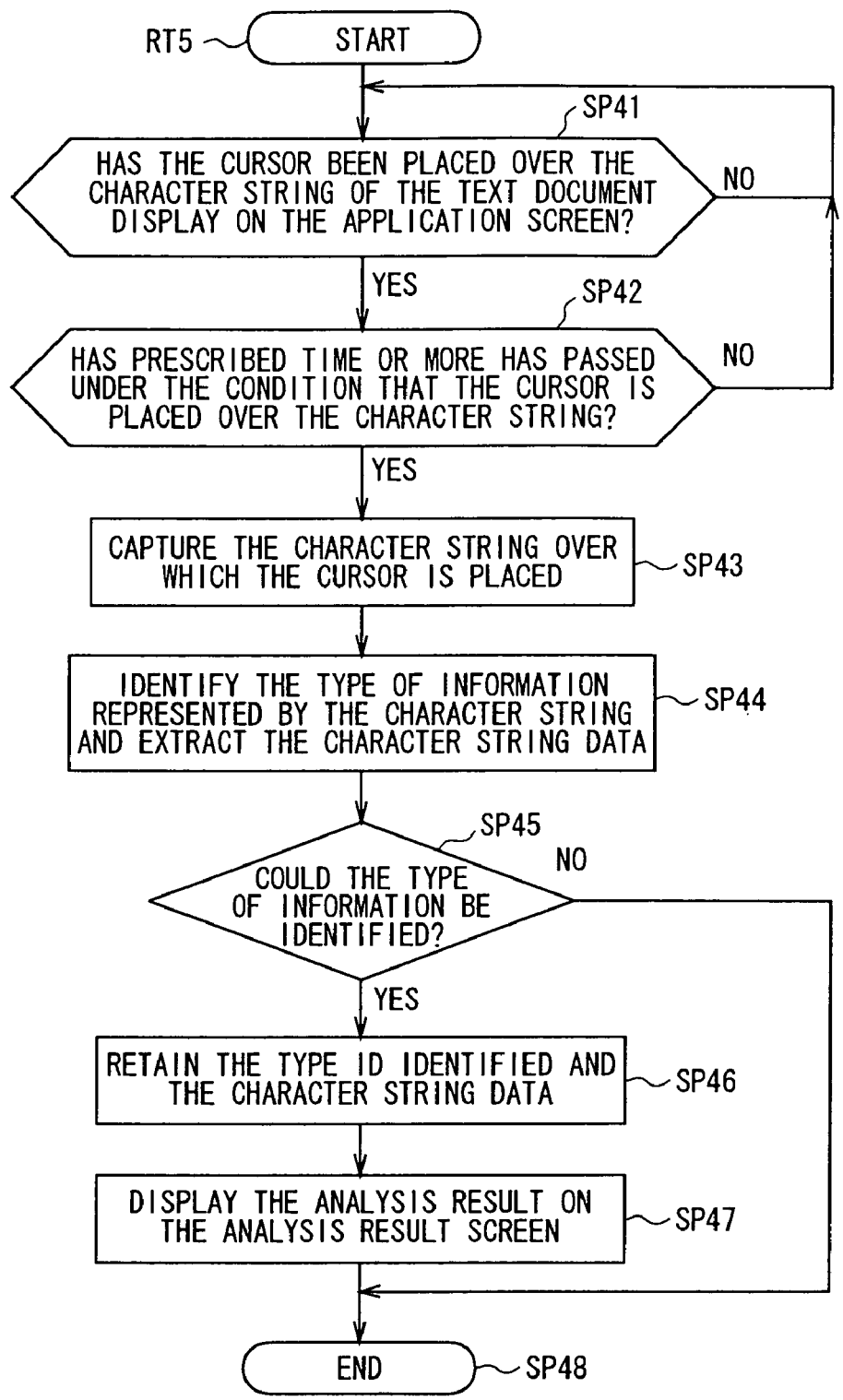
FIG. 18 is a flow chart of a procedure of processing of capturing and analyzing the character string appointed by a cursor in an application screen.

Next, capturing and analysis processing procedure of capturing the character string D1 of a text document over which the cursor 449 is placed over the application screen and analyzing the character string D1 will be described. In this case, the CPU 52 executes the capturing and analysis processing for the flow chart shown in FIG. 18 in accordance with the application of Address Catcher 302 in the character string capturing element 101 to analysis result displaying element 103.

The CPU 52 first enters into a starting step of the routine RT5 and then proceeds to a step of SP41. When entering into processing in the character string capturing element 101 in the step of SP41, the CPU 52 determines whether or not the cursor 449 has been placed over the character string of the text document displayed on the application screen.

If a negative result is obtained here, it indicates that the cursor 449 is not placed over the character string, and the CPU 52 then returns to the 5P41 and waits until the cursor 449 is placed over the character string.

In contrast, if a positive result is obtained in the step of SP41, it indicates that the cursor 449 is placed over the character string, and the CPU 52 then proceeds to a next step of SP42.

When entering into processing in the character string analyzing element 102, the CPU 52 determines whether or not a designated time or more has passed under the condition that the cursor 449 is placed over the character string. If a negative result is obtained here, it indicates that the cursor 449 has been already moved before prescribed time or more passes under the condition that the cursor 449 is placed over the character string, and the CPU 52 then returns to the step of SP41 for repeating this processing.

In contrast, if a positive result is obtained in the step of SP42, it indicates that prescribed time or more has passed under the condition that the cursor 449 is placed over the character string and the CPU 52 proceeds to a next step of SP43.

In the step of SP43, the CPU 52 captures the part of character string over which the cursor 449 is placed and transmits the same to the character string analyzing element 102 as character string D1 as in the case of the step SP12 of the routine RT12 (FIG. 14), and then proceeds to a next step of SP44.

When entering into processing in the character string analyzing element 102 in the step of SP44, the CPU 52 determines the type of information represented by the character string D1, extracts the character string data D2, and then proceeds to a next step of SP45, as in the case of the step of SP13.

In the step of SP45, the CPU 52 determines whether or not the type of information represented by the character string D1 has been identified, as in the case of the SP14 of the routine RT2. If a negative result is obtained here, it indicates that the type of information represented by the character string D1 has not been identified, and the CPU 52 proceeds to a step of SP48 for ending the character string capturing and analysis processing.

In contrast, if a positive result is obtained in the step of SP45, it indicates that the type of information represented by the character string D1 has been identified, and the CPU 52 then transmits the type ID of the character string D1 and the character string data D2 to the analysis result displaying element 103 and proceeds to a next step of SP46.

When entering into processing in the analysis result displaying element 103 in the step of SP46, the CPU 52 retains the type ID of the character string D1 and the character string data D2 as in the case of the step of SP15 of the routine RT2, and then proceeds to a step of SP47.

In the step of SP47, the CPU 52 generates the analysis result screen 420 on the basis of the type ID and the character string data D2, displays the same near the character string D1 on the clip screen 410 (FIG. 12) as in the case of the step of SP16 of the routine RT2, and then proceeds to the step of SP48 for ending the character string capturing and analysis processing procedure.

(4) Operation and Advantage in the Embodiment

In the configuration described above, the CPU 52 of the computer equipment 1 photographs the name card 110 by the CCD camera 23, and recognizes and reads the character string D1 in accordance with the application of Cyberclip 301 when focus is on the character string D1 set in the recognition box 411A of the finder display area 411 in the clip screen 410 (FIG. 10), followed by registering and displaying the character string D1 in the read history tab 412, and moving and placing the cursor 409 on the character string D1 registered.

The CPU 52 monitors whether or not prescribed time or more has passed under the condition that the cursor 409 is placed over the character string D1 in the read history tab 412 in accordance with the application of Address Catcher 302, and captures the character string D1 when detecting that prescribed time or more has been passed.

Furthermore, the CPU 52 determines the type of information represented by the character string D1 captured and extracts the character string data D2, followed by generating the analysis result screen 420 and displaying the same on the liquid crystal display 21 by the analysis result displaying element 103.

In this way, the computer equipment 1 displays the analysis result screen 420 on the liquid crystal display 21, thereby making the user recognize that the result of analyzing the character string D1 of the name card 110 photographed by the CCD camera 23 is "telephone number" and the number is "03-5448-O△△X," and allowing the user to recognize the accuracy of the result at first sight by the recognition level bar 422.

When the user clicks the retrieval run button 423 in the analysis result screen 420, the CPU 52 initiates the digital map software 60B (Navin'yo 303) corresponding to the type ID of the character string D1 in accordance with the application of Address Catcher 302, and supplies the character string data D2 to the digital map software 60B (Navin'yo 303).

In the CPU 52, the character string data D2 are not supplied and linked to the digital map software 60B (Navin'yo 303) until the user clicks the retrieval run button 423 in the analysis result screen 420, thereby allowing the user to execute link operation only when he or she intends to execute retrieval processing in accordance with the character string data D2 after confirming the result of analysis, thus preventing execution of processing against user' intention.

When linking the digital map software 60B (Navin'yo 303) to the character string data D2, the CPU 52 acquires the latitude and longitude corresponding to the character string data D2 in accordance with the digital map software 60B (Navin'yo 303), retrieves a point on map around the latitude and longitude, and displays the map screen 430 corresponding to the result of retrieving on the liquid crystal display 21.

That is, the user can obtain the analysis result screen 420 of the character string D1 and confirm the type of information simply by setting in the recognition box 411A the character string D1 imaged on the clip screen 410 by the CCD camera 23, and can confirm the map screen 430 including a point on map corresponding to the character string D2 simply by clicking the retrieval run button 423 of the analysis result screen 420.

In a similar way, the computer equipment 1, when the cursor 449 is placed over a character string in the application screen displayed on the liquid crystal display 21 and prescribed time or more passes thereafter, can display the analysis result screen 420 by capturing and analyzing the character string as the character string D1, and can link the digital map software 60B with the character string data D2 and execute point retrieval when the retrieval run button 423 of the analysis result screen 420 is clicked.

That is, also in this case, the user can obtain the analysis result screen 450 of the character string D1 (FIG. 17) and confirm the type of information simply by handling a mouse to place the cursor 449 on the character string that he or she wants to analyze on the application screen, and can confirm a point on map corresponding to the character string D2 via the map screen 430 (FIG. 12) simply by clicking the retrieval run button 453 in the analysis result screen 450.

According to the configuration described above, the computer equipment 1 reads the character string D1 designated by the user from the image of the name card 110 photographed by the CCD camera 23 and analyze the same, and displays the analysis result screen 420 on the liquid crystal display 21, thereby making the user recognize the type of information represented by the character string D1 and the character string data D2 via the analysis result screen 420, thus allowing the user to recognize the result of analysis of the character string D1 using a simple operation of photographing the name card 110 that he or she wants to analyze by the CCD camera 23.

Also, in the computer equipment 1, when the user clicks the retrieval run button 423 after confirming the analysis result screen 420 and agreeing with the result of analysis, by initiating the digital map software 60B (Navin'yo 303) corresponding to the type of information represented by the character string D1 and linking the character string data D2 thereto, retrieving a point of on the map corresponding to the character string data D2, and displaying the map screen 430 including the area of that point on the liquid crystal display 21, the user can easily obtain the result of retrieving using a simple operation of clocking the retrieval run button 423 when he or she agrees with the result of analysis and intends to execute point retrieval.

(5) Other embodiments

In the above embodiment, the case is described where the character string D1 set in the recognition box 411A in the image photographed by the CCD camera 23 as photographing means is read by the CPU 52 and the application of Cyberclip 301 as character string reading means using the OCR equipment, but the present invention is not limited thereto, and the character string D1 in the image photographed by the CCD camera 23 may be read using different methods other than OCR equipment.

Furthermore, in the above embodiment, the case is described where the CPU 52 executes the character string analyzing and linking processing in accordance with the character string analyzing and linking system 100 which works by operating various applications in connection with each other, but the present invention is not limited thereto, and the CPU 52 may execute the character string analyzing and linking processing in accordance with the character string analyzing and linking system contained as part of the OS provided by computer readable medium such as floppy disks, compact disk-read only memory (CD-ROM) and digital versatile disk (DVD), semiconductor memories and magnetic disks storing a program transitionally or permanently, transmission medium, such as wired or wireless communication media such as local area network, internet and digital satellite broadcast, and provided media such as a variety of communications interfaces such as routers and modems for transferring or receiving programs provided via these communication media.

Furthermore, in the above embodiment, the case is described where the character string D1 is captured and analyzed by the CPU 52 and the application of Address Catcher 302 as character string capture and analysis means, and displays the result analysis screen 420 on the liquid crystal display 21 as display means by the CPU 52 and the application of Address Catcher 302 as display controlling means, thereby making the user recognize that the type of information represented by the character string D1 is telephone number, executing retrieval of a point corresponding to the telephone number of the character string data D2 by the CPU 52 and the application of the digital map software (Navin'yo 303) as linking means, and displaying the map screen 430 corresponding to the result of retrieval thereof, but the present invention is not limited thereto, and designated processing may be executed by identifying the type of information represented by the character string D1 as postal code, address, latitude and longitude, map code representing the latitude and longitude, e-mail addresses, uniform resource locator (URL), dates, monetary amount units or general units such as km, kg, cm and yard, and linking the character string data D2 with a postal code location retrieval application retrieving and showing the location on the map for which the postal code is defined, an address location retrieval application retrieving and showing the location on the map corresponding to the address, a latitude and longitude retrieval application retrieving and showing the location on the map corresponding to the latitude and longitude, a map code retrieval application retrieving and showing the location on the map corresponding to the map code, an e-mail sending application sending e-mail to e-mail address, a hyper text markup language (HTML) browser opening a homepage based on the URL, a scheduler application opening the calendar and the schedule corresponding to the date, a money conversion application automatically converting a designated amount of money into the amount corresponding to other monetary amount unit, or an electronic computer application performing various calculations using the value corresponding to the unit, a personal information retrieval application retrieving personal information on the basis of postal code, address, latitude and longitude, map code, e-mail address or the URL.

Furthermore, in the above embodiment, the case is described where the character string is read from the image photographed by the CCD camera 23 in the computer equipment 1 integral with camera, but the present invention is not limited thereto, and the image photographed by a digital steel camera etc. may be captured from the outside via the IEEE 1394 terminal 41 and read the character string therefrom.

According to the present invention as described above, a more reliable information processing apparatus can be achieved, wherein the character string is read from the image and analyzed and the result of analysis thereof is displayed as the analysis result screen, thereby allowing the user to recognize the type of information represented by the character string described in the subject to be photographed and the information represented by the character string simply by making photographing mean image the desired subject to be photographed, thus making it possible to analyze the character string and execute desired processing only by a simple operation by a user.

Furthermore, according to the present invention, an information processing method can be achieved, wherein the character string is read from the image and analyzed and the result of analysis thereof is displayed as the analysis result screen, thereby allowing the user to recognize the type of information represented by the character string described in the subject to be photographed and the information represented by the character string simply by making photographing means image the desired subject to be photographed, thus making it possible to analyze the character string and execute desired processing only by a simple operation by a user.

Furthermore, according to the present invention, a provision medium can be achieved, wherein the character string is read and analyzed in accordance with the program of the provision medium and the result of analysis thereof is displayed as the analysis result screen, thereby allowing the user to recognize the type of information represented by the character string described in the subject to be photographed and the information represented by the character string simply by making photographing means image the desired subject to be photographed, thus making it possible to analyze the character string and execute desired processing only by a simple operation by a user.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:
1. An information processing apparatus comprising:
   character string reading means for reading a character string in an image of a business card photographed by photographing means;
   character string capture and analysis means for identifying that a type of information represented by said character string corresponds to one of a telephone number, a postal code, an address, an e-mail address, a Uniform Resource Locator (URL), a date and a monetary amount by capturing and analyzing said character string read by said character string reading means, and extracting said information represented by said character string, and automatically selecting, from a plurality of available applications, a graphical map-based navigational application based on said character string when said type of character string corresponds to an address, postal code, or a telephone number and automatically selecting another one of said plurality of available applications when said type of character string corresponds to an e-mail address, a URL, a date or a monetary amount; and display controlling means for generating an analysis result screen including said type of information represented by said character string and said information of said character string obtained by said character string capture and analysis means, and displaying said analysis result screen on display means, wherein said character string capture and analysis means identifies a type of information represented by the read character string by comparing a format of the read character string to a format of a plurality of types of information stored in a character string analysis database, wherein said character string reading means registers said character string read in a read history tab provided in the screen of said display means to display the same therein, and places a cursor over the newest said character string; and said character string capture and analysis means captures said character string when said cursor is placed over said character string and a prescribed time or more passes thereafter.

2. The information processing apparatus according to claim 1, wherein said character string reading means recognizes and reads a character string in said image using optical character reader (OCR) means.

3. An information processing method, comprising:

reading a character string in an image of a business card photographed by photographing means;

capturing and analyzing said character string for identifying that a type of information represented by said character string corresponds to one of a telephone number, a postal code, an address, an e-mail address, a Uniform Resource Locator (URL), a date, and a monetary amount and extracting said information represented by said character string, and automatically selecting, from a plurality of available applications a graphical map-based navigational application based on said character string when said type of character string corresponds to an address, a postal code or a telephone number and automatically selecting another one of said plurality of available applications when said type of character string corresponds to an e-mail address, a URL a date, or a monetary amount and identifying a type of information represented by the read character string by comparing a format of the read character string to a format of a plurality of types of information stored in a character string analysis database; and generating an analysis result screen including said type of information represented by said character string and said information of said character string obtained by said step of capturing and analyzing, and displaying the analysis result screen on display means, wherein said reading registers said character string read in a read history tab provided in the screen of said display means to display the same therein, and places a cursor over the newest said character string; and said capturing and analyzing captures said character string when said cursor is placed over said character string and a prescribed time or more passes thereafter.

4. The information processing method according to claim 3, wherein said step of reading recognizes and reads a character string in said image using optical character reader (OCR) means.

5. A computer readable medium for making an information processing apparatus to execute an instruction set, comprising:

reading a character string in an image of a business card photographed by photographing means;

capturing and analyzing said character string for identifying that a type of information represented by said character string corresponds to one of a telephone number, a postal code, an address, an e-mail address, a Uniform Resource Locator (URL), a date, and a monetary amount, and extracting said information represented by said character string, and automatically selecting, from a plurality of available applications a graphical map-based navigational application based on said character string when said type of character string corresponds to an address, postal code or a telephone number and automatically selecting another one of said plurality of available applications when said type of character string corresponds to an e-mail address, a URL, a date or a monetary amount and identifying a type of information represented by the read character string by comparing a format of the read character string to a format of a plurality of types of information stored in a character string analysis database; and generating an analysis result screen including said type of information represented by said character string and said information of said character string obtained by said step of capturing and analyzing, and displaying the analysis result screen on display means, wherein said reading registers said character string read in a read history tab provided in the screen of said display means to display the same therein, and places a cursor over the newest said character string; and said capturing and analyzing captures said character string when said cursor is placed over said character string and a prescribed time or more passes thereafter.

6. The computer readable medium according to claim 5, wherein said step of reading recognizes and reads a character string in said image using optical character reader (OCR) means.

7. An information processing apparatus comprising:

an optical character reader configured to read a character string in an image of a business card photographed by a photographing device;

a character analyzer configured to identify that a type of information represented by said character string corresponds to one of a telephone number, a postal code, an address an e-mail address, a Uniform Resource Locator (URL), a date, and a monetary amount by capturing and analyzing said character string read by said optical character reader, and extract said information represented by said character string, and automatically selecting, from a plurality of available applications, a graphical map-based navigational application based on said character string when said type of character string corresponds to an address, postal code or a telephone number and automatically selecting another one of said plurality of available applications when said type of character string corresponds to an e-mail address, a URL, a date or a monetary amount; and a display driver configured to generate an analysis result screen including said type of information represented by said character string and said information of said character string obtained by said optical character reader, and display said analysis result screen on a display wherein said character analyzer identifies a type of information represented by the read character string by comparing a format of the read character string to a format of a plurality of types of information stored in a character string analysis database, wherein said optical character reader registers said character string read in a read history tab provided in the screen of said display to display the same therein, and places a cursor over the newest said character string, and said character analyzer captures said character string when said cursor is placed over said character string and a prescribed time or more passes thereafter.

* * * * *